US012280373B2

(12) United States Patent
Noé et al.

(10) Patent No.: US 12,280,373 B2
(45) Date of Patent: Apr. 22, 2025

(54) ELECTROCHEMICAL FLUIDIC VALVE AND DEVICES CONTAINING THE SAME

(71) Applicant: SWITCHBACK SYSTEMS, INC., Santa Cruz, CA (US)

(72) Inventors: Mary S. Noé, Los Gatos, CA (US); Eugene P. Marsh, El Granada, CA (US)

(73) Assignee: Switchback Systems, Inc., Santa Cruz, CA (US)

( * ) Notice: Subject to any disclaimer, the term of this patent is extended or adjusted under 35 U.S.C. 154(b) by 0 days.

(21) Appl. No.: 18/579,234

(22) PCT Filed: Jul. 15, 2022

(86) PCT No.: PCT/US2022/037324
§ 371 (c)(1),
(2) Date: Jan. 12, 2024

(87) PCT Pub. No.: WO2023/288075
PCT Pub. Date: Jan. 19, 2023

(65) Prior Publication Data

US 2024/0359178 A1 Oct. 31, 2024

Related U.S. Application Data

(60) Provisional application No. 63/222,572, filed on Jul. 16, 2021.

(51) Int. Cl.
*B01L 3/00* (2006.01)

(52) U.S. Cl.
CPC ... *B01L 3/502746* (2013.01); *B01L 3/502738* (2013.01); *B01L 2300/0645* (2013.01); *B01L 2400/0418* (2013.01)

(58) Field of Classification Search
None
See application file for complete search history.

(56) References Cited

U.S. PATENT DOCUMENTS

| | | | | | |
|---|---|---|---|---|---|
| 5,439,757 | A * | 8/1995 | Zito | H01M 8/04186 | 429/50 |
| 5,992,820 | A * | 11/1999 | Fare | B01L 3/50273 | 204/601 |
| 7,375,404 | B2 * | 5/2008 | Park | B81B 7/0061 | 257/40 |
| 8,709,355 | B2 * | 4/2014 | Chan | B01D 67/0088 | 436/164 |
| 2003/0047220 | A1 * | 3/2003 | Lopez | F16K 99/0044 | 137/599.01 |
| 2003/0150716 | A1 * | 8/2003 | Hua | F16K 99/0019 | 205/687 |

(Continued)

*Primary Examiner* — Harry D Wilkins, III
(74) *Attorney, Agent, or Firm* — WILSON SONSINI GOODRICH & ROSATI

(57) ABSTRACT

Fluidic systems and devices include at least one reaction channel, the at least one reaction channel comprising: a working electrode; a counter electrode disposed at a distance from the working electrode; and a channel electrically connected to both the working electrode and the counter electrode, wherein a voltage applied to the working electrode relative to the counter electrode will cause the solubility of the polysaccharide in the solution to change thereby modulating flow in, out or both of the channel.

20 Claims, 18 Drawing Sheets

(56) References Cited

U.S. PATENT DOCUMENTS

| | | | | |
|---|---|---|---|---|
| 2005/0230767 | A1* | 10/2005 | Park | B81B 7/0061 438/51 |
| 2007/0172821 | A1* | 7/2007 | Wu | B81C 1/00206 438/1 |
| 2018/0327916 | A1* | 11/2018 | Bandyopadhyay | C25B 9/17 |

* cited by examiner

ELECTROCHEMICAL FLUIDIC VALVE AND DEVICES CONTAINING THE SAME

PRIORITY APPLICATION

This application is the § 371 U.S. National Stage of International Application No. PCT/US2022/037324, filed Jul. 15, 2022, which claims the benefit of U.S. Provisional Application No. 63/222,572, filed Jul. 16, 2021, the disclosures of which are incorporated by reference herein in their entireties.

FIELD

The present disclosure relates to fluidic and microfluidic devices. The present disclosure further relates to methods of using such fluidic and microfluidic devices.

BACKGROUND

There are currently many fluidic systems that are being utilized in a wide variety of applications, from molecular biology applications, such as oligonucleotide synthesis, nucleic acid annealing, denaturation, ligation, polymerase chain reaction (PCR), and protein synthesis, as well as chemical synthesis applications, and sensing applications. Existing fluidic systems typically suffer from an inability to be easily scaled up to be able to efficiently and cost-effectively provide larger quantities of product. As such, there remains a need for methods and fluidic devices capable of providing scaled up processes.

SUMMARY OF THE INVENTION

Disclosed herein are fluidic and microfluidic devices and systems, collectively referred to as fluidic devices and systems. The fluidic devices may be used to control flow of fluids in the fluidic system. The fluidic device may be used as a valve. The fluidic device includes at least one reaction channel. In some embodiments, the fluidic device includes a plurality of reaction channels. The at least one reaction channel includes a working electrode; a counter electrode; and a channel. The counter electrode is disposed at a distance from the working electrode. The channel is electrically connected to both the working electrode and the counter electrode such that the counter electrode is not in direct contact with the working electrode. A solution is provided within the channel and may provide electrical contact between the electrodes. The solution includes an electrolyte and may include at least one flow control compound. A voltage applied to the working electrode relative to the counter electrode causes the solubility of the flow control compound in the solution to change, thereby modulating flow in, out, or both in and out of the channel. In some embodiments, the flow control compound is a polysaccharide or a hydrogel.

Also disclosed herein are fluidic devices that include at least a working electrode; a porous metal membrane formed in electrical contact with the working electrode; and a valve, the valve comprising a solution in contact with the porous metal membrane and the working electrode, the solution comprising at least one polysaccharide and an electrolyte, wherein a voltage applied to the working electrode will cause the solubility of the polysaccharide in the solution to change thereby modulating flow relative to the porous metal membrane.

Also disclosed is a method of modulating flow in a reaction channel, the reaction channel comprising: a working electrode; a counter electrode; and a channel, wherein the channel is electrically connected to both the working electrode and the counter electrode, and the working electrode is disposed at a distance from the counter electrode, the method comprising: adding a solution into the channel, the solution comprising at least one polysaccharide and an electrolyte; and applying a voltage to the working electrode relative to the counter electrode, wherein application of the voltage modulates flow in, out or both of the channel by affecting the solubility of the at least one polysaccharide.

Alternately a hydrogel, such as, PASP-l-PNIPAAm or a similar polymer that responds to changes in pH and/or temperature, may be used as the flow control agent to modulate flow in, out, or both of the channel. PASP-l-PNIPAAm is composed of poly(aspartic acid) (PASP) and poly(N-isopropylacrylamide) (PNIPAAm).

The fluidic devices or methods herein, wherein the working electrode comprises a coating of metal on at least a portion of the inner surface of the channel.

The fluidic devices or methods herein, further comprising an adhesion layer positioned between the inner surface of the channel and the coating of metal that forms the working electrode. The fluidic devices or methods above, wherein the adhesion layer comprises Ti, TiN, $TiO_2$, Ta, $Ta_2N_5$, $Al_2O_3$, or similar.

The fluidic devices or methods herein, wherein the working electrode is electrically connected to an electrical contact for connection to a power source.

The fluidic devices or methods herein, wherein the working electrode, the counter electrode, or both independently comprise a noble metal, an alloy of a noble metal, an oxide of a noble metal, or any combination thereof. Alternately the electrodes are comprised of a metal such as nickel, cobalt, or similar. Further the electrodes could be comprised of a conductive oxide such as indium tin oxide, $Ti_xNb_yO_z$, or similar.

The fluidic devices or methods herein, wherein the working electrode, the counter electrode, or both independently comprise platinum (Pt), gold (Au), iridium (Ir), rhodium (Rh), ruthenium (Ru), alloys thereof, or oxides thereof.

The fluidic devices or methods herein, wherein the application of the voltage to the working electrode will cause the pH of the solution to change thereby affecting the solubility of the polysaccharide.

The fluidic devices or methods herein, wherein the application of the voltage to the working electrode will cause the temperature of the solution to change thereby affecting the solubility of the polysaccharide.

The fluidic devices or methods herein, wherein the application of the voltage to the working electrode will cause both the pH and the temperature of the solution to change thereby affecting the solubility of the polysaccharide.

The fluidic devices or methods herein, wherein the channel has a width from 0.05 micrometers (μm) to 10,000 μm. The fluidic devices or methods herein, wherein the channel has a length from 0.1 millimeters (mm) to 5000 mm.

The fluidic devices or methods herein, wherein the working electrode and the counter electrode are from 10 μm to 1000 μm apart.

The fluidic devices or methods herein, wherein the fluidic device comprises a plurality of reaction channels in the form of an array. The fluidic devices or methods above wherein the counter electrodes of each reaction channel are a single structure. The fluidic devices or methods above, wherein the single structure comprises a plate covering one major surface of the array. The fluidic devices or methods above, wherein the plate is electrically isolated from the working electrodes of each reaction channel by a gasket or insulating spacer.

The fluidic devices or methods herein, wherein the polysaccharide is selected from alginates, chitosan, chitin, chemically modified versions of these saccharides, or combinations thereof.

The fluidic devices or methods herein, wherein the polysaccharide is chitosan, chitin, a chemically modified version of chitosan or chitin, or a combination thereof.

The fluidic devices or methods herein, wherein the polysaccharide is at a concentration of 0.05 grams/Liter (g/L) to 5 g/L in the solution.

The fluidic devices or methods herein, wherein the solution may further comprise acetic acid, propanoic acid, malonic acid, maleic acid, malic acid, hydroxybenzoic acid, formic acid, oxalic acid, citric acid, or combinations thereof.

The fluidic devices or methods herein, wherein the solution further comprises inorganic salts, organic salts, or combinations thereof.

The fluidic devices or methods herein, wherein the inorganic salt is selected from KOH, NaOH, $NH_4OH$, or combinations thereof.

The fluidic devices or methods herein, wherein the organic salt is selected from tetraethylammonium p-toluenesulfonate, 1-butyl 3-methyl-imidazolium tetrafluoroborate, 1-butyl-3-methyl imidazolium tosylate, 1,1-dimethyl-pyrrolidinium tris(pentafluoroethyl)trifluorophosphate, 1,3-dimethyl-imidazolium trifluoromethanesulfonate, 3-methyl-N-butyl-pyridinium hexafluorophosphate, tetraethyl ammonium tetrafluoroborate, N-hexyl-pyridinium hexafluorophosphate, or combinations thereof.

The fluidic devices or methods herein, wherein application of the voltage for a first amount of time, $t_1$, restricts flow within the reaction channels.

The fluidic devices or methods herein, wherein application of the voltage for a second amount of time, $t_2$, wherein $t_2$ is longer than $t_1$, stops flow within the reaction channels.

The fluidic devices or methods herein, wherein the working electrode is a porous metal membrane on a first end of the channel. The fluidic devices or methods above, wherein the porous metal membrane comprises a functionalized layer of sintered silica nanoparticles, metal oxide nanoparticles, or metal particles. The fluidic devices or methods above, wherein the functionalized layer comprises a noble metal. The fluidic devices or methods above, wherein the noble metal comprises platinum (Pt), gold (Au), iridium (Ir), rhodium (Rh), ruthenium (Ru), their conductive oxides, or alloys thereof. Alternately the electrodes are comprised of a metal such as nickel, cobalt, or similar. Further the electrodes could be comprised of a conductive oxide such as indium tin oxide, $Ti_xNb_yO_z$, or similar. The fluidic devices or methods above, wherein application of the voltage causes a polysaccharide film to form from the solution on the working electrode, thereby blocking flow out of that end of the channel. The fluidic devices or methods above, wherein the second end of the channel also comprises a porous metal membrane formed thereon. The fluidic devices or methods above, wherein application of the voltage causes a polysaccharide film to form from the solution on both of the porous metal membranes, thereby blocking flow out of one or both ends of the channel.

The fluidic devices or methods herein, wherein the solubility of the polysaccharide functions to stop flow in, out, or both of the reaction channel.

The fluidic devices or methods herein, wherein the solubility of the polysaccharide functions to control the flow rate in, out or both of the reaction channel.

The fluidic devices or methods herein, wherein application of a second voltage that is the reverse polarity of the first voltage functions to increase the solubility of the polysaccharide.

Definitions

The terms "fluidic device" and "fluidic system" are used here to refer to systems and devices used for handling and controlling the flow of fluids, for example into, through, around, across, via, (etc.) a region. Such fluidic devices and systems may be used to handle fluids as part of specific processes, such as those associated with, for example, molecular biology applications, chemical synthesis applications, and sensing applications. The term "fluidic" is understood to also encompass "microfluidic." A microfluidic device or system may be used to handle fluid volumes and flow rates at a microliter (μL) scale (e.g., ranging from 1-10,000 μL).

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements.

By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

Unless otherwise specified, "a," "an," "the," and "at least one" are used interchangeably and mean one or more than one.

As used herein, the term "or" is generally employed in its usual sense including "and/or" unless the content clearly dictates otherwise.

The term "and/or" means one or all of the listed elements or a combination of any two or more of the listed elements.

Any reference to standard methods (e.g., ASTM, TAPPI, AATCC, etc.) refer to the most recent available version of the method at the time of filing of this disclosure unless otherwise indicated.

Also herein, the recitations of numerical ranges by endpoints include all numbers subsumed within that range (e.g., 1 to 5 includes 1, 1.5, 2, 2.75, 3, 3.80, 4, 5, etc.).

Herein, "up to" a number (for example, up to 50) includes the number (for example, 50).

The term "in the range" or "within a range" (and similar statements) includes the endpoints of the stated range.

For any method disclosed herein that includes discrete steps, the steps may be conducted in any feasible order. And, as appropriate, any combination of two or more steps may be conducted simultaneously.

All headings are for the convenience of the reader and should not be used to limit the meaning of the text that follows the heading, unless so specified.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

Unless otherwise indicated, all numbers expressing quantities of components, molecular weights, and so forth used in the specification and claims are to be understood as being modified in all instances by the term "about." As used herein in connection with a measured quantity, the term "about" refers to that variation in the measured quantity as would be expected by the skilled artisan making the measurement and exercising a level of care commensurate with the objective of the measurement and the precision of the measuring equipment used. Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1A:
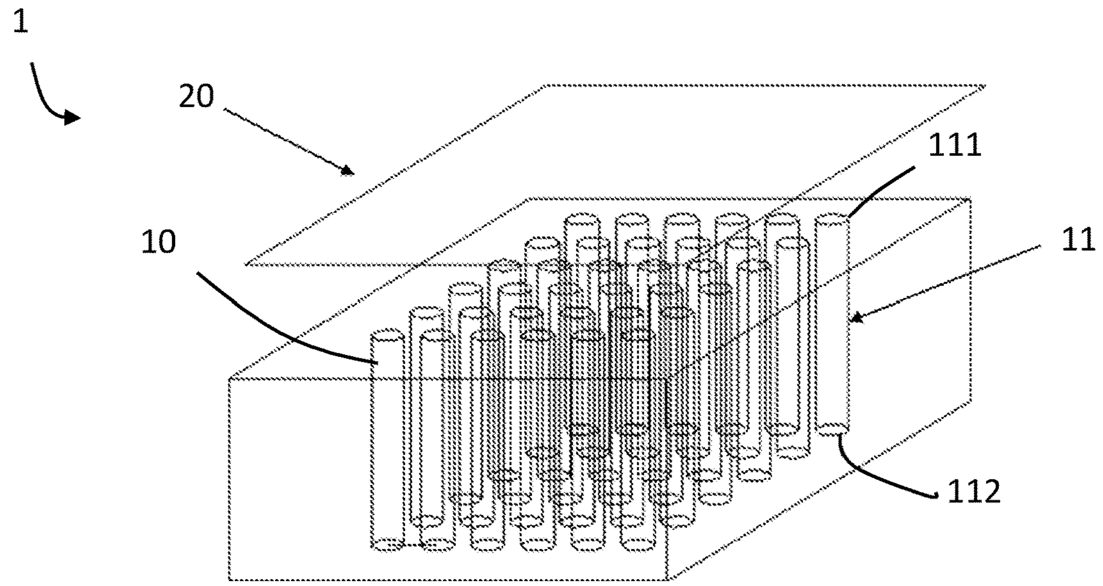
FIG. 1A is a schematic perspective view of a plurality of channels in a fluidic device according to an embodiment.

Disclosed herein are fluidic devices that can be utilized to control the flow of fluid into, through, around, across, via, (etc.) a region. Further disclosed are fluidic systems that include the fluidic device and a solution within the device. Such fluidic devices and systems may be used for handling and controlling the flow of fluids, for example into, through, around, across, via, (etc.) a region. Such fluidic devices and systems may be used to handle fluids as part of specific processes, such as those associated with, for example, molecular biology applications, chemical synthesis applications, and sensing applications. In particular, the fluidic devices and systems may be used to handle fluids as part of gene synthesis processes. The fluidic devices and systems may be used to form a controllable valve in a system, such as a reaction system. The fluidic devices and systems may be used to form a reaction chamber (e.g., an isolated volume in which a reaction may occur) that may be opened and closed. The fluidic devices and systems may be used to provide a controllable flow path, where flow through the flow path may be controlled between an open state, a closed state, and any partially open state between the open and closed states.

In some embodiments, the fluidic devices may be referred to as microfluidic devices. The fluidic devices generally include at least one reaction channel. A reaction channel can include a first electrode, a second electrode, and a channel. The channel is electrically connected to both the first electrode and the second electrode. The first electrode and the second electrode are electrically isolated from each other (i.e., the counter electrode is not in direct contact with the working electrode.) A solution is provided within the channel and may provide electrical contact between the electrodes.

According to an embodiment, the fluidic devices and systems of the present disclosure are used with a solution that includes a compound capable of reversibly precipitating in response to a change in the pH or temperature of the solution. That is, the compound is capable of precipitating in response to a change in the pH or temperature of the solution and capable of dissolving in response to an opposite change in the pH or temperature of the solution. The capable of reversibly precipitating in response to a change in the pH or temperature of the solution will be referred to here as the "flow control compound." In some embodiments, the flow control compound is a polysaccharide. In some embodiments the flow control compound is or includes a hydrogel, such as PASP-l-PNIPAAm (poly(aspartic acid) ("PASP") and poly(N-isopropylacrylamide) ("PNIPAAm"), or a similar polymer, which responds to changes in pH and/or temperature by reversibly precipitating.

According to an embodiment, the solubility of the flow control compound (e.g., a polysaccharide or hydrogel), is utilized to control the flow of fluid by controlling a voltage to the electrode. Upon changing the voltage, the flow control compound (e.g., a polysaccharide or hydrogel) is either dissolved into solution, thereby allowing flow, or precipitates out of solution, thereby impairing flow. The particular nature of the flow can depend at least in part on the overall structure of the device or the larger structure within which the "valve" is formed.

According to an embodiment, the solubility of the polysaccharide is utilized to control the flow of fluid by controlling a voltage to the electrode. Upon changing the voltage, the polysaccharide is either dissolved into solution, thereby allowing flow, or precipitates out of solution, thereby impairing flow.

According to an embodiment, the solubility of the hydrogel is utilized to control the flow of fluid by controlling a voltage to the electrode. Upon changing the voltage, the hydrogel is either dissolved into solution, thereby allowing flow, or precipitates out of solution, thereby impairing flow.

In some embodiments, the channel and the first and second electrodes function electrochemically to change the pH of the solution, thereby affecting the solubility of the flow control compound (e.g., a polysaccharide or hydrogel). The first electrode may be referred to as a working electrode. The second electrode may be referred to as a counter electrode. In some embodiments, the channel and the first and second electrodes function through changing the temperature of a solution, thereby affecting the solubility of the flow control compound (e.g., a polysaccharide or hydrogel). In such cases the first electrode may be referred to as simply an electrode and the second electrode may be referred to as ground, or common.

The fluidic device may include a plurality of channels. For example, the channel may be one of the capillaries in a glass capillary array (GCA). In other embodiments, the channel may be a capillary tube in a bulk material in which an array of channels have been formed. In other embodiments, the channels may include groups of channels patterned in a material using lithographic processing. For example, channels may be formed in silicon using an anodic porous silicon patterning process. In other embodiments, channels may include channels patterned into or onto a plastic surface for example. In some embodiments, where the device includes a plurality of capillary channels, the number of channels may be 100,000 or greater, 1 million or greater. The number of capillary channels may be up to 100 million. The capillary channels may be provided as groups of channels. For example, a group of capillary channels may include 100 to 100,000 channels. In some embodiments, the device includes from 10 or more, 20 or more, 50 or more, or 100 or more channels. The device may include 10,000 or fewer, 5000 or fewer, 2000 or fewer, or 1000 or fewer channels.

The shape, dimensions, and/or other features of the channel may be chosen based on the desired application of the overall device. In some embodiments, the channel can have a generally cylindrical shape. In embodiments where the channel has a generally cylindrical shape, it may be described by the width or diameter of the channel. In some embodiments, a channel can have a diameter of not less than 0.5 micrometers, not less than 0.1 micrometers, or even not less than 0.05 micrometers. In some embodiments, a channel can have a diameter of not greater than 500 micrometers, not greater than 1000 micrometers, not greater than 5000 micrometers, or not greater than 10,000 μm. The length from one end of the channel to the other end of the channel can be not less than 0.1 millimeters, not less than 0.01 mm, or even not less than 0.001 mm. In some embodiments, the length of the channel can be not greater than 50 mm, not greater than 1000 mm, or even not greater than 5000 mm. Generally, smaller diameters may be coupled with the shorter lengths.

The working electrode and the counter electrode (or more generally the first electrode and the second electrode, respectively) may be made of the same or different materials. In some embodiments, the working electrode and the counter electrode may independently both include one or more noble metals. Illustrative noble metals can include, for example, platinum (Pt), gold (Au), iridium (Ir), rhodium (Rh), and ruthenium (Ru). Additionally, the working electrode and the counter electrode may independently both include a conductive oxide of a noble metal, or an alloy of a noble metal. Additionally, the working electrode and the counter electrode may independently both include one or more noble metals, one or more oxides of a noble metal, one or more alloys of a noble metals, or any combination thereof. Additionally, the working electrode and the counter electrode may independently both include a conductive oxide of a metal, or an alloy of metals, or metal oxides which form a conductive film. Alternately, the electrodes could include oxides such as $SiO_2$, $Al_2O_3$, $TiO_2$ or similar, doped with a metal such as platinum, nickel, tungsten, or similar metals. In some embodiments, a working electrode and a counter electrode may include or consist of platinum (Pt), for example.

In some embodiments, the working electrode may be a coating on an inner surface of the channel. In some embodiments, the working electrode may be a coating having a thickness of not less than 0.002 micrometers (μm), not less than 0.01 μm, not less than 0.1 μm, or even not less than 0.5 μm thick. In some embodiments, the working electrode may be a coating having a thickness of not greater than 0.2 μm, not greater than 0.5 μm, or even not greater than 1.0 μm thick. In some embodiments, the working electrode is formed by a coating having a thickness in a range of 0.002 μm to 1.0 μm, or 0.01 μm to 0.5 μm.

Optionally, in some embodiments where the working electrode is a coating on an inner surface of the channel, an adhesion layer may be present between the inner surface of the channel and the metal layer. The adhesion layer functions to increase adhesion of the metal layer to the material of the inner surface itself. In some embodiments, the adhesion layer may include Ti, TiN, $TiO_2$, Ta, $Ta_2N_5$, or $Al_2O_3$, or the like, or a combination thereof. The specific material chosen may depend at least in part on the material of the inner surface of the channel, the material of the working electrode, other factors not specifically called out herein, or any combination thereof.

The working electrode may also be a porous metal layer on one end of the channel. Such porous metal layers can be formed on an underlying support by depositing a discontinuous layer of metal, leaving open islands of oxide. Alternately, a layer of silica nanoparticles, or similar oxide particles, can be deposited on the electrode surface and sintered. The oxide particles may further be functionalized with an organo-silane monolayer. Exemplary surface treatments for providing an organo-silane monolayer include N-(3-triethoxysilylpropyl)-4-hydroxybutyramide, N,N-Bis (2-Hydroxyethyl)-3-Aminopropyltriethoxysilane, N-(2-aminoethyl)-3-aminopropyltrimethoxysilane, 3-(4-semicarbazidyl)propyltriethoxysilane, 3-glycidyloxypropyl) triethoxysilane, 3-glycidyloxypropyl)trimethoxysilane, 2-[(acetoxy(polyethyleneoxy)propyl]triethoxysilane, acetoxymethyltriethoxysilane, acetoxymethyltrimethoxysilane, or similar. The functionalized surface may be used to covalently bind oligonucleotides or other molecules of interest to the surface.

In some embodiments, a channel may have a working electrode at one or both ends of the channel. For example, the channel may have a porous metal layer at one or both ends of the channel. In such embodiments, when a voltage is applied to one or both ends of the channel, the flow can be stopped going either direction out of the channel and the volume within the channel can effectively be trapped between the two membranes.

In some embodiments, the counter electrode can be part of a larger structure that is shared by one or more channels. In other embodiments, the counter electrode is specific to each channel in an array (in embodiments where arrays are present). In some embodiments, the counter electrode is a single structure that is shared by a plurality of channels. In some such embodiments, the single structure may include a plate covering a surface of the array. For example, a plate can be configured to cover a surface of a structure in which a plurality of channels are formed. The plate can even more fully be described as covering one major surface of the array. A plate can function as multiple counter electrodes for multiple reaction channels by electrically isolating the portion of the plate which is acting as each of the counter electrodes from each of the other counter electrodes by for example, a gasket which is electrically insulating.

In some embodiments, the overall size of the device can be described by the distance between the working electrode and a counter electrode of a single reaction channel. In some embodiments, a working electrode and the counter electrode of a single reaction channel are from 1 μm to 1000 μm apart, or from 10 μm to 1000 μm apart, or for example about 250 μm apart.

In some embodiments, multiple working electrodes and a single counter electrode may be provided for a single channel. The channel may be formed as a groove or trench in a block of material. Such channels may be fitted with multiple electrodes per channel. The channel may be formed in an insulating substrate. Examples of suitable insulating substrates include silicon oxide, glass, and insulating polymers, such as polymethylmethacrylate (PMMA), polycarbonate (PC), polystyrene (PS), and polydimethylsiloxane (PDMS). The trenches can be formed by, molding, stamping, etching or other patterning processes such as two-photon polymerization. A working electrode may be formed on the inside surface of the channel by coating of a conductive layer. Such coatings may be prepared, for example, by physical vapor deposition (PVD), chemical vapor deposition (CVD), atomic layer deposition (ALD), electrochemical plating, or electroless plating techniques. The working electrode may be a coating having a thickness of not less than 0.002 μm, not less than 0.1 μm, or even not less than 0.5 μm thick. In some embodiments, the working electrode may be a coating having a thickness of not greater than 0.2 μm, not greater than 0.5 μm, or even not greater than 1.0 μm thick. The channel may include multiple working electrodes that are individually connected to a power source.

An insulating spacer may be deposited on the working electrode using PVD, CVD of ALD deposition processes. Similarly, the counter electrode may be deposited onto the insulating cover, and the cover with the counter electrode may then be bonded to the base substrate which contains the working electrode.

Alternatively, the positions of the working electrode and counter electrode may be swapped such that the counter electrode is provided as a plating on the inside surface of the channel and the working electrode is spaced apart from the counter electrode by an insulating spacer.

The working electrode and the counter electrode may independently both include one or more noble metals. Illustrative noble metals can include, for example platinum (Pt), gold (Au), iridium (Ir), rhodium (Rh), and ruthenium (Ru). Additionally, the working electrode and the counter electrode may independently both include a conductive oxide of a noble metal, or an alloy of a noble metal. Additionally, the working electrode and the counter electrode may independently both include one or more noble metals, one or more oxides of a noble metal, one or more alloys of a noble metals, or any combination thereof. Additionally, the working electrode and the counter electrode may independently both include a conductive oxide of a semi-noble metal, or an alloy of metals, or metal oxides which form a conductive film. Alternately, the electrodes may include oxides, such as $SiO_2$, $Al_2O_3$, $TiO_2$ or similar, doped with a metal such as platinum, nickel, tungsten or similar metals. In some embodiments, a working electrode and a counter electrode may include platinum (Pt), for example.

The device may be provided as a system and may include a solution (e.g., a fluid). The solution may be present within the channel. In some embodiments, the solution includes a flow control compound. In some embodiments, the solution includes a polysaccharide. In some embodiments, the solution includes a hydrogel. The flow control compound (e.g., a polysaccharide or hydrogel) may be used as part of the system to modulate flow. For example, the flow control compound (e.g., a polysaccharide or hydrogel) may be selectively precipitated to reduce the inside diameter of the channel(s), thus reducing available cross-sectional area for fluid flow. In a closed or partially closed state, the precipitated flow control compound (e.g., a polysaccharide precipitate or hydrogel precipitate) may become part of the wall (e.g., coats the inside surface of the wall) of the channel. The precipitate may be selectively dissolved to open the channel. The precipitation of the flow control compound (e.g., a polysaccharide or hydrogel) may be used as a fluidic valve. Illustrative polysaccharides include, for example, alginates, chitosan, chitin, chemically modified versions of these saccharides, and combinations thereof. In some embodiments, a polysaccharide can include chitosan, chitin, a chemically modified version of chitosan or chitin, or a combination thereof. In some embodiments, the polysaccharide is chitosan. The amount of polysaccharide present in the solution within the channel can vary and may be chosen based on the desired time for the flow to be affected, the desired time for the flow to be turned off, turned back on, or both, the desired voltage to be applied, the overall purpose of the device or methods utilizing the device, or combinations thereof. For example, the flow control compound (e.g., polysaccharide) may be preset at a concentration of 0.05 grams/liter (g/L) of the solution or greater, 0.1 g/L or greater, 1 g/L or greater, or 2 g/L or greater. The polysaccharide may be preset at a concentration of 5 g/L of the solution or less, 4 g/L or less, 3 g/L or less, or 2 g/L or less. In some embodiments, the flow control compound (e.g., polysaccharide) is present at a concentration of 0.05 g/L to 5 g/L in the solution. In some embodiments, the solution contains from 0.2 g/L to 2.0 g/L of chitosan.

Alternately a hydrogel, such as, PASP-l-PNIPAAm or a similar polymer that responds to changes in pH and/or temperature, may be used as the flow control agent to modulate flow in, out, or both of the channel. PASP-l-PNIPAAm is composed of poly(aspartic acid) (PASP) and poly(N-isopropylacrylamide) (PNIPAAm).

The solution may also include other optional components. In some embodiments, the solution may include components that may affect the pH of the solution when the power is on to the working electrode, when the power is off to the working electrode, or both. In some embodiments, such components can be referred to as a pH controlling compound. In some embodiments, useful compounds include, for example, acetic acid, propanoic acid, phosphoric acid, 2-(N-morpholino)ethanesulfonic acid, malonic acid, maleic acid, malic acid, hydroxybenzoic acid, formic acid, oxalic acid, citric acid, salts thereof, and combinations thereof. Suitable concentrations of the buffer range from 0.001 M to 0.1M.

The solution may also include one or more electrolytes. The electrolytes may include inorganic compounds, organic compounds, or both. Illustrative inorganic compounds can include, for example, sodium hydroxide (NaOH), potassium hydroxide (KOH), similar compounds, and combinations thereof. In some embodiments, the electrolytes may include organic compounds. Illustrative organic compounds can include, for example tetraethylammonium p-toluenesulfonate, 1-butyl 3-methyl-imidazolium tetrafluoroborate, 1-butyl-3-methyl imidazolium tosylate, 1,1-dimethyl-pyrrolidinium tris(pentafluoroethyl)trifluorophosphate, 1,3-dimethyl-imidazolium trifluoromethanesulfonate, 3-methyl-N-butyl-pyridinium hexafluorophosphate, tetraethyl ammonium tetrafluoroborate, N-hexyl-pyridinium hexafluorophosphate, salts thereof, and combinations thereof. In one embodiment, the solution includes KOH. Suitable concentrations of electrolytes range from 0.001 M to 0.005M.

The first electrode is generally electrically connected to a source of power. In some embodiments, application of a voltage to the working electrode will cause the pH of the solution to change. A change in pH may affect the solubility of the flow control compound (e.g., a polysaccharide or hydrogel). In some embodiments, application of a direct current (DC) voltage to the working electrode of from −1.5 volts to −30 volts relative to the counter electrode, for a specified time, for example, can cause the production of $H_2$ gas and hydroxide anions at the electrode surface, thereby increasing the pH of the solution. Different flow control compounds may react differently to a change in pH. Some flow control agents may precipitate in response to the pH being above a threshold pH, whereas other flow control agents may precipitate in response to the pH being below a threshold pH. In the case of polysaccharides, when the pH increases sufficiently, the polysaccharide is no longer soluble in the solution (e.g., the electrolyte) and the polysaccharide will precipitate out onto the working electrode. The precipitation may be aided by electrophoretic drift of the polysaccharide ions from the bulk solution. Application of a voltage to the working electrode causes a film of flow control compound (e.g., a polysaccharide or hydrogel) to be formed at the working electrode surface. The film thickness will vary with the length of time the bias voltage is applied. This film thickness can be used to modulate the internal diameter of the channel and, thereby affect the flow within the channel. Application of the voltage for a longer period of time will cause the film thickness to grow, and at some point, depending on the parameters of the channel, the solution, etc. the film will be thick enough to entirely block the flow of a solution in or out of the channel. In some embodiments, application of a voltage for a time period of from 0.01 to 500 seconds can cause the flow into, out of, or both the channel to be modulated by the solubility of the flow control compound (e.g., a polysaccharide or hydrogel). The voltage may be applied until the thickness of the film of flow control compound (e.g., a polysaccharide or hydrogel) is equal to half of the inner diameter of the channel. That is, the voltage may be applied until the film completely blocks the channel. Reversing the polarity of the voltage can then be utilized to cause the flow control compound (e.g., a polysaccharide or hydrogel) to dissolve, thus reducing the thickness of the film. That is, reversing the polarity of the voltage may be used to increase the flow into, out of, or both into and out of, the channel. If the flow has been completely shut down by the thickness of the film, reversing the polarity of the voltage may be used to allow some flow into, out of or both the channel.

In some embodiments, application of a voltage (or removal of a voltage) to the first electrode will cause the temperature of the solution to increase or decrease, thereby affecting the solubility of the flow control compound (e.g., a polysaccharide or hydrogel). In some embodiments, application of a voltage (or removal of a voltage) to the first electrode will cause the pH of the solution to change and the temperature of the solution to increase or decrease, which may both thereby affect the solubility of the flow control compound (e.g., a polysaccharide or hydrogel) In some embodiments, an increase in pH may be used to precipitate the flow control compound, and a decrease in pH may be used to solubilize the flow control compound. A decrease in temperature may be used to precipitate the flow control compound, and an increase in temperature may be used to solubilize the flow control compound.

Figure 1B:
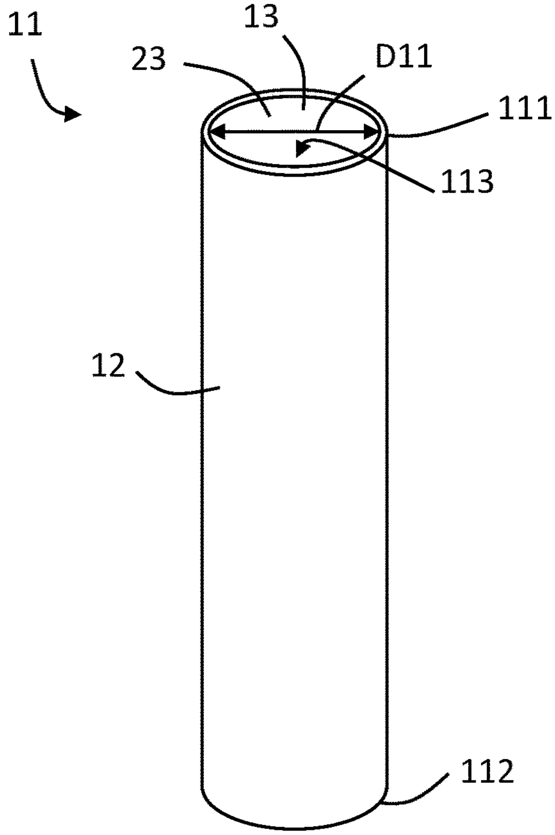
FIG. 1B is a schematic perspective view of a single channel in the plurality of channels of FIG. 1A.

According to an embodiment, an exemplary device 1, shown in FIGS. 1A-1D, incudes a plurality of channels 10 (e.g., a glass capillary array). The plurality of channels 10 serves as an array of fluidic (e.g., microfluidic) reaction channels 11. A single channel 11 is schematically depicted in FIG. 1B. The channels 11 have a wall 12 extending from a first end 111 to a second end 112. The channels 11 have an inside surface 13 defining a hollow interior 113 and having a cross-sectional dimension (e.g., inside diameter) D11 between the first and second ends 111, 112. Each channel 11 is individually functionalized with a conductive coating 23 (e.g., a platinum coating) to act as the working electrode 50 in an electrochemical cell. The conductive coating 23 may be provided in any suitable location in or on the channel 11. In the embodiment shown in FIG. 1B, the conductive coating 23 is provided along the inside surface 13 of the channel. Suitable materials for preparing the conductive coating 23 are described above. The conductive coating may be deposited on an intervening adhesion layer, such as Ti, TiN, $TiO_2$, Ta, $Ta_2N_5$, $Al_2O_3$, or similar.

According to an embodiment, the plurality of channels 10 has a uniform pore size. The pore size of the plurality of channels 10 is understood as the inside diameter D11 of the channels 11. The inside diameter D11 of the channels 11 may be in a range of 0.5 μm to 500 μm. The diameter (pore size) may be determined, for example, by using an optical microscope or scanning electron microscope. The length L11 of the channels 11 may be in a range of 0.1 mm to 500 mm.

Figure 2:
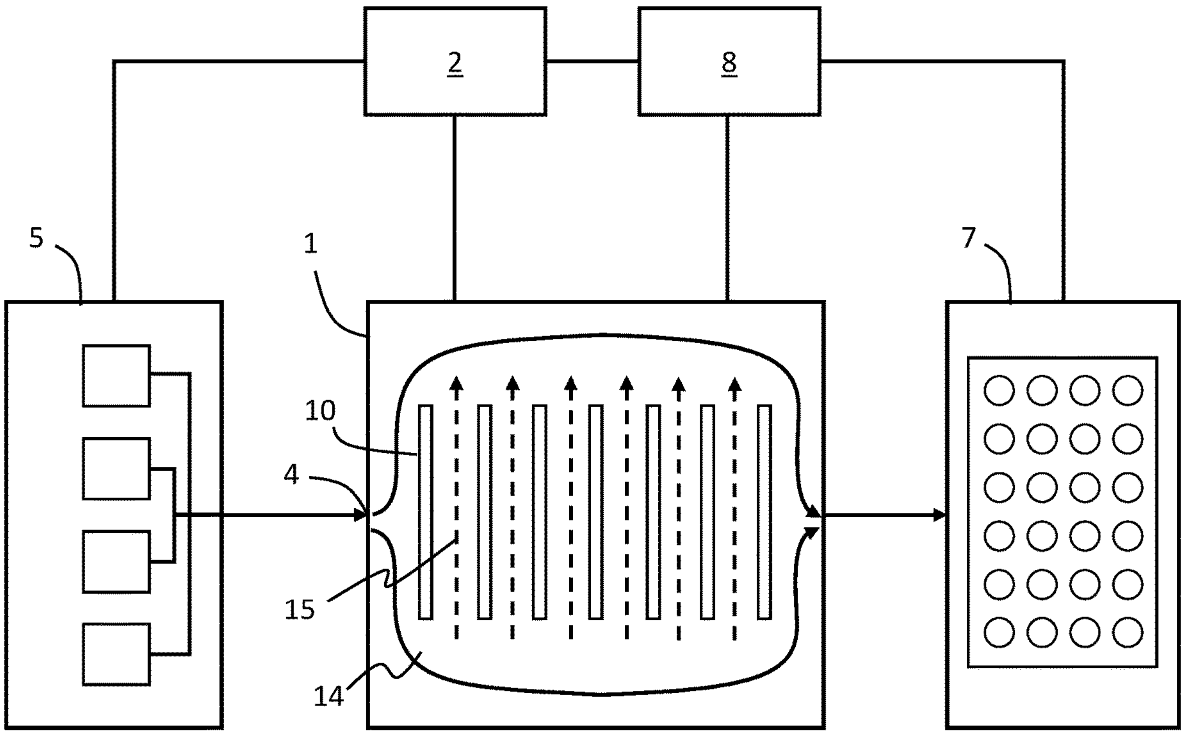
FIG. 2 is a schematic of a system including the device of FIG. 1A according to an embodiment.

The device 1 may be used to control flow in various processes, such as gene synthesis or chemical synthesis processes. The device 1 may be used to selectively recovery products from a synthetic reaction. An exemplary system including the device 1 is shown in FIG. 2. The device 1 may include a fluid input 4. The fluid input 4 may receive a fluid flow from an input device 5, such as a valve manifold. The device 1 may further include a fluid output 6. The fluid output 6 may direct fluid into a receptacle 7, such as a well plate. The system (including device 1, input device 5, and receptacle 7) may be controlled by a control device 8, such as a microprocessor. The system (including device 1, input device 5, and receptacle 7) may be connected to a power source 2.

The fluid input device 5 may direct fluid flow into the device 1. The fluid flow may include a bypass flow 14, flowing past the plurality of channels 10. The fluid flow may include a through flow 15 flowing through the plurality of channels 10. The through flow 15 may be controlled by controlling the precipitation of the flow control compound in the solution flowing in the device 1, as further described herein.

Figure 3A:
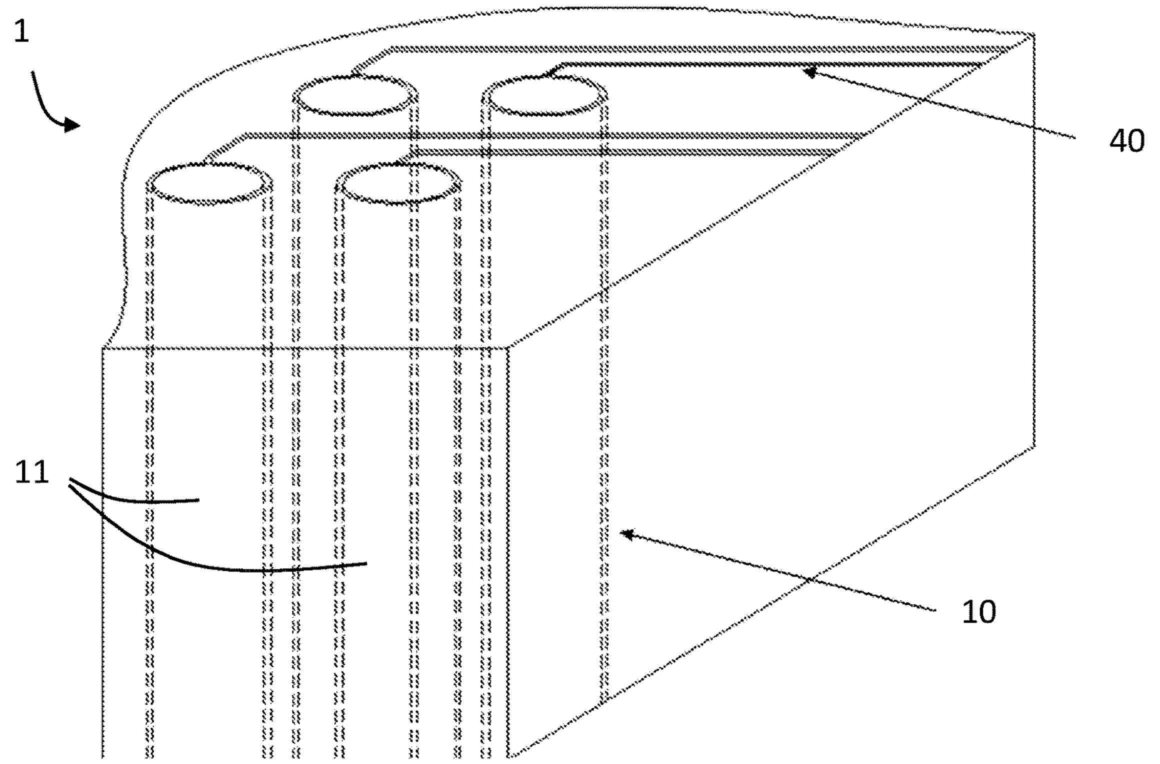
FIG. 3A is a schematic perspective view of a portion of the plurality of channels of FIG. 1A.
Figure 3B:
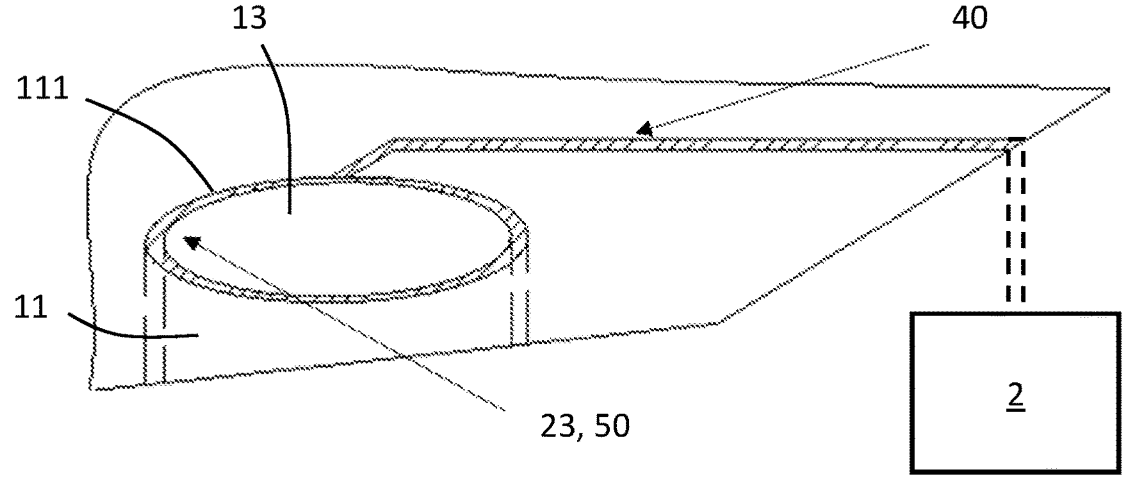
FIG. 3B is a closeup view of a portion of a single channel and its working electrode and interconnect in plurality of channels of FIG. 3A.

According to an embodiment, each of the working electrodes 50 may be individually connected to an external power source 2. The working electrodes 50 may be connected to the external power source 2 through a series of conducting metal lines 40, as shown in FIGS. 3A and 3B. In some embodiments, the series of conducting metal lines 40 is patterned on the top surface of the plurality of channels 10. Optionally, the channels 11, or groups of channels 11, can be connected to the power source 2 by etching the surfaces surrounding the channels 11 and providing conducting metal lines 40 at either end of the channels 11. In the embodiment shown in FIG. 3B, the working electrode 50 is provided by a conductive coating 23 on the inside surface 13 of the channel 11.

Figure 4A:
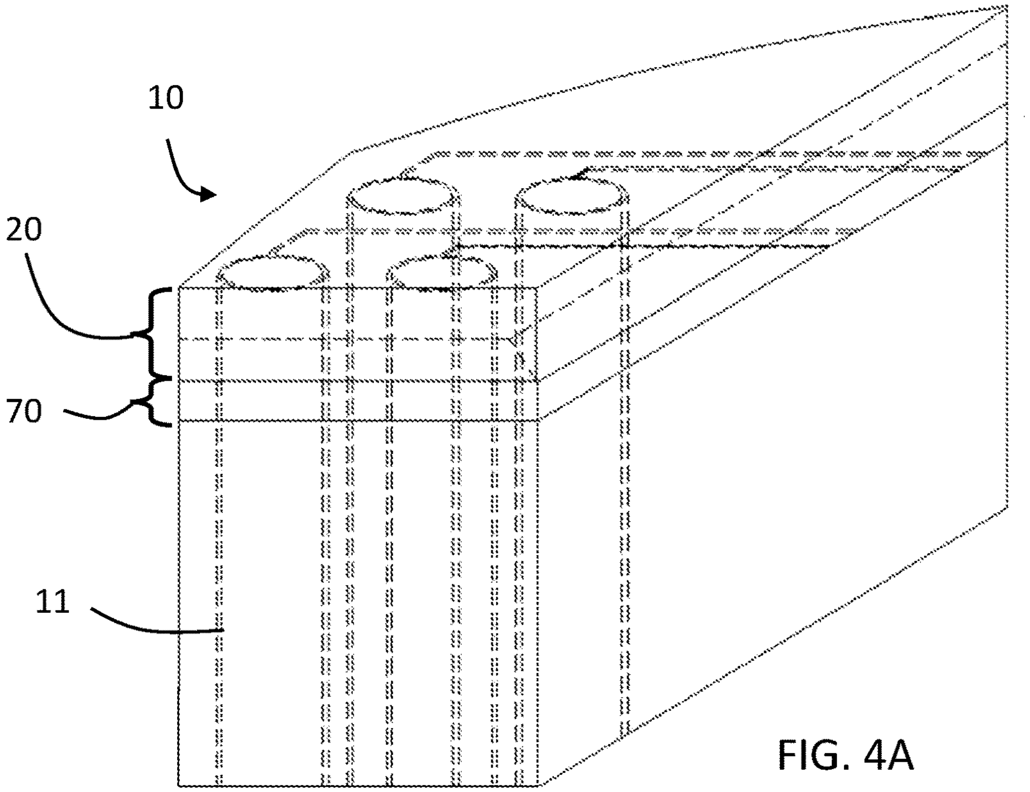
FIG. 4A is a schematic perspective view of a portion of an electrochemical cell in the device of FIG. 1A, showing channels, interconnects, gasket, and counter electrode.
Figure 4B:
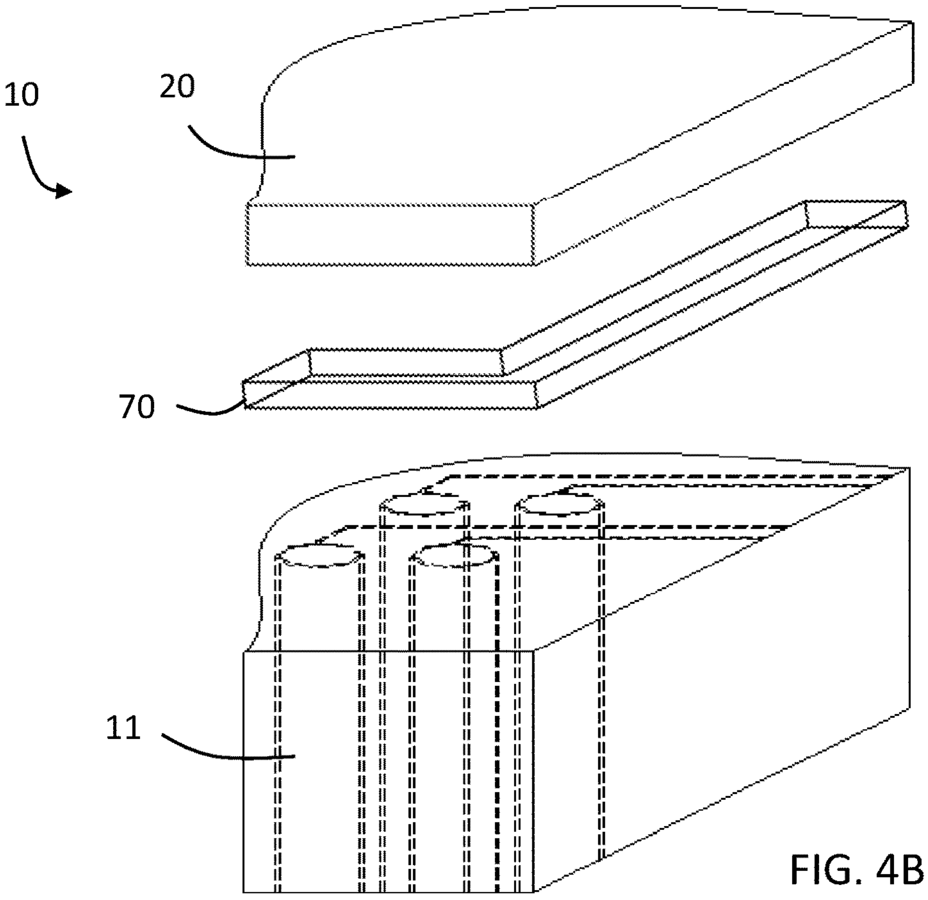
FIG. 4B is an exploded view of the portion shown in FIG. 4A.

The device 1 also includes a counter electrode 20. The counter electrode 20 can be electrically isolated from the working electrode 50 in that the counter electrode 20 is not in direct contact with and is disposed at a distance from the working electrode 50. In some embodiments, such as those shown in FIGS. 1A, 4A, and 4B, the counter electrode 20 is provided as a conductive plate disposed on one or both sides of the plurality of channels 10. The counter electrode 20 may be electrically isolated from the working electrode 50 by using a chemically resistant gasket 70. The gasket 70 may surround the edges of the block containing the plurality of channels 11, leaving the center area open for flow of the solution. Alternately, the counter electrode 20 and working electrode 50 are separated by glass or ceramic spacers. The counter electrode 20 and working electrode 50 may be hermetically sealed using a low temperature frit glass material. The gasket 70 may provide a desired distance of separation between the working electrode 50 and the counter electrode 20. The spacing of the counter electrode 20 and working electrode 50 may provide a uniform separation between the working and counter electrodes 50, 20 of between 1 μm to 1000 μm. The gasket 70 may also act as the fluidic seal between the working and the counter electrodes 50, 20.

When the device 1 is used with aqueous solutions, hydrolysis of water can be used to modulate the pH at the electrode surfaces, with hydroxide anion production at the cathode surface, and hydronium production at the anode surface. Alternately, for aqueous solutions, redox reagents such as hydroquinone may be added to the solution as additional acid generating species.

The solution in the channels may be an electrolyte. The electrolyte may include an aqueous solution. The electrolyte may include a solution of polysaccharides such as alginates, chitosan, chitin, chemically modified versions of these saccharides, or the like, or a combination thereof. The solution may be formulated to include a concentration of from 0.05 g/L to 5 g/L polysaccharide in acetic acid, phosphoric acid, propanoic acid, malonic acid, maleic acid, malic acid, 2-(N-morpholino)ethanesulfonic acid, hydroxybenzoic acid, formic acid, oxalic acid, citric acid, or similar acidic solution. The acid solution being at concentrations for 0.001M to 2M, or pH values of about 2 to 5.

The electrolyte may include inorganic salts, such as KOH, or NaOH, or organic salts, such as tetraethylammonium p-toluenesulfonate, 1-butyl 3-methyl-imidazolium tetrafluoroborate, 1-butyl-3-methyl imidazolium tosylate, 1,1-dimethyl-pyrrolidinium tris(pentafluoroethyl)trifluorophosphate, 1,3-dimethyl-imidazolium trifluoromethanesulfonate, 3-methyl-N-butyl-pyridinium hexafluorophosphate, tetraethyl ammonium tetrafluoroborate, N-hexyl-pyridinium hexafluorophosphate, or similar, or a combination thereof. The salt or salts may be present at a concentration of 0.01 mM or greater, 0.1 mM or greater, 0.5 mM or greater, or 1 mM or greater. The salt or salts may be present at a concentration of 5 mM or less, 4 mM or less, mM or less, or 2 mM or less. The salt or salts may be present at a concentration ranging from 0.01 mM to 5 mM, 0.1 mM to 4 mM, or 0.5 mM to 3 mM.

The counter electrode 20 and working electrode 50 may be used to change the pH, temperature, or both pH and temperature of the solution inside the channel 11 to induce the precipitation or solubilization of the polysaccharide. For example, purified polysaccharides are dissolved in water at a pH of 2.4 to 3. The pH may then be adjusted with an acetate, other buffer, or base to a pH value of 2.7 to 6. To activate the switching, a DC voltage of −1.5 volts to −30 volts is applied to the working electrodes 50, relative to the counter electrode 20, for 0.1 to 500 seconds, for example. This produces $H_2$ gas and hydroxide anions at the electrode surface, thereby increasing the pH. When the pH increases sufficiently, the polysaccharide is no longer soluble in the electrolyte and precipitates out onto the working electrode 50 (the inside surface of the channel 11), aided by electrophoretic drift of the polysaccharide ions from the bulk solution. This is illustrated in FIGS. 2A-2C. FIG. 2A is an illustration of a capillary channel 11 with conductive coating 23 and represents the channel 11 in a fully open state 90. In the fully open state 90, the cross-sectional dimension available for fluid flow through the channel 11 is equal to the inside diameter D11 of the channel. After the voltage is applied to the electrode, a polysaccharide film 80, shown in FIG. 2B, is formed at the working electrode 50 surface. The film thickness will vary with the length of time the bias voltage is applied. This film thickness can be used to modulate the internal diameter and, therefore, flow within the fluidic channel. The cross-sectional dimension D80 available for fluid flow through the channel 11 is reduced from the inside diameter D11 of the channel by the thickness T80 of the film 80. The film 80 can be deposited at a thickness T80 sufficient to block flow in a microchannel, shown in FIG. 2C. In this case, the device 1 is in a fully closed stage 92 and is acting as a closed valve.

Figure 6:
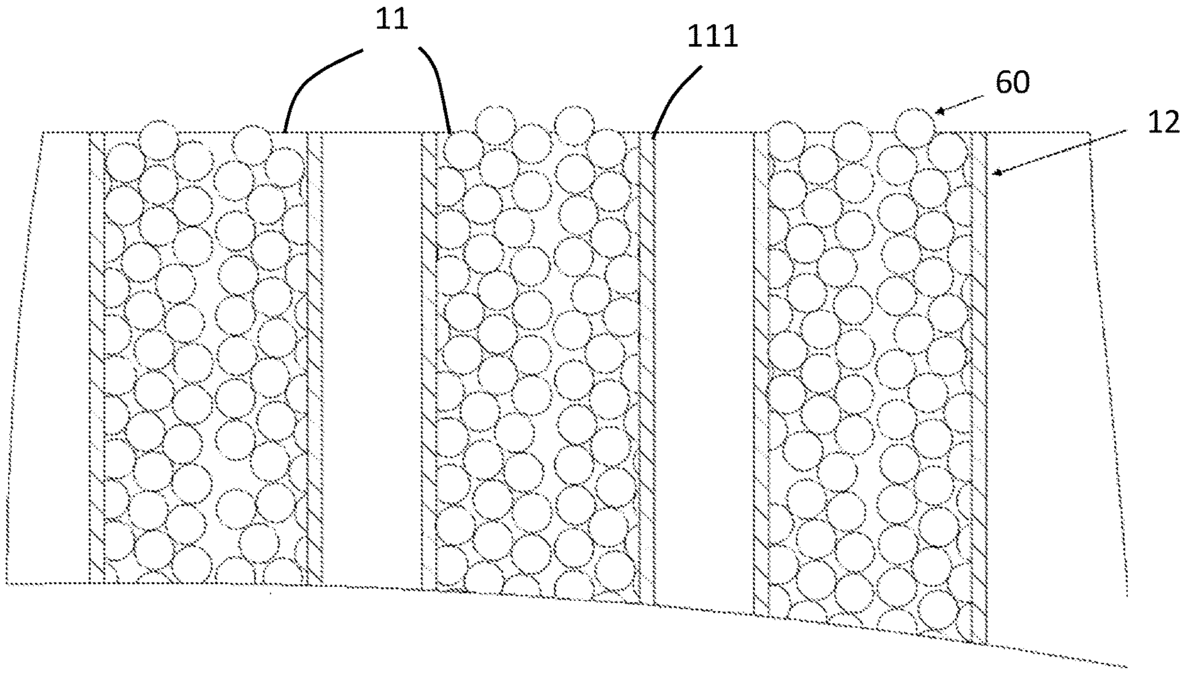
FIG. 6 partial cross-sectional side view of a plurality of channels, showing channels and $SiO_2$ nanoparticles according to an embodiment.

The working electrode may alternatively be provided by a metal layer deposited on nanoparticles 60, such as $SiO_2$ or metal oxide nanoparticles. The metalized nanoparticles 60 may be used to fill the channel 11, as shown in FIG. 6, and may serve as a solid support for use as a reaction bed. The nanoparticles 60 may further be functionalized with an organo-silane monolayer for the covalent binding of a molecule of interest, such as an oligonucleotide, to the surface. A surface treatment such as N-(3-triethoxysilylpropyl)-4-hydroxybutyramide, N,N-Bis(2-Hydroxyethyl)-3-Aminopropyltriethoxysilane, N-(2-aminoethyl)-3-aminopropyltrimethoxysilane, 3-(4-semicarbazidyl)propyltriethoxysilane, 3-glycidyloxypropyl)triethoxysilane, 3-glycidyloxypropyl)trimethoxysilane, 2-[(acetoxy(polyethyleneoxy)propyl]triethoxysilane, acetoxymethyltriethoxysilane, acetoxymethyltrimethoxysilane, or similar may be used. When the device is used, the flow control compound may precipitate onto the metalized nanoparticles. Depositing precipitated flow control compound (e.g., polysaccharide or hydrogel) on the metalized nanoparticles blocks the flow in the fluidic channel 11. The precipitate-coated metalized nanoparticles function as a closed valve.

Figure 7A:
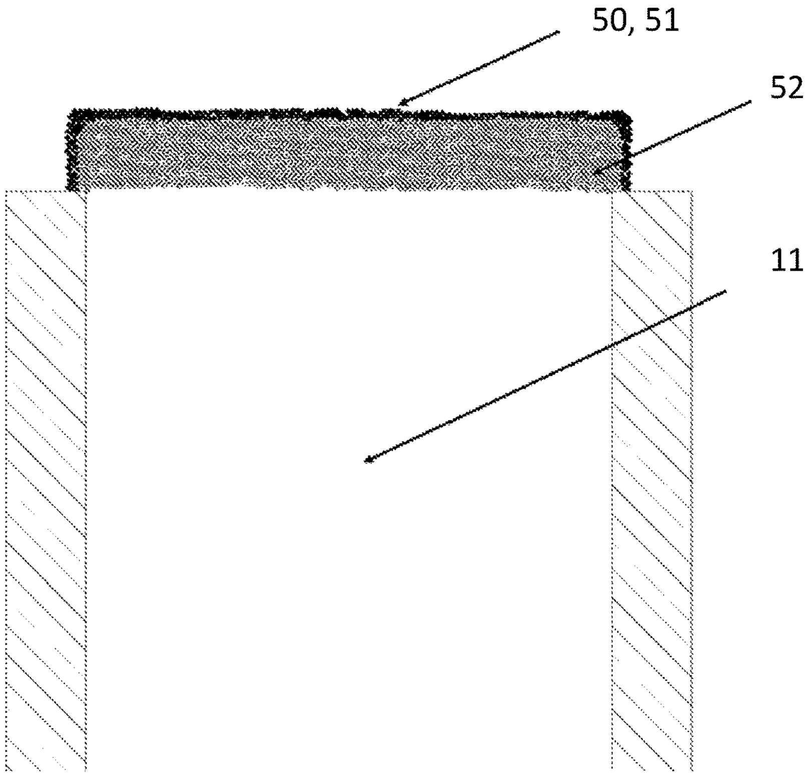
FIG. 7A is a schematic cross-sectional side view of a channel and a porous membrane used for modulating flow according to an embodiment. The channel is in the open, full flow state.
Figure 7B:
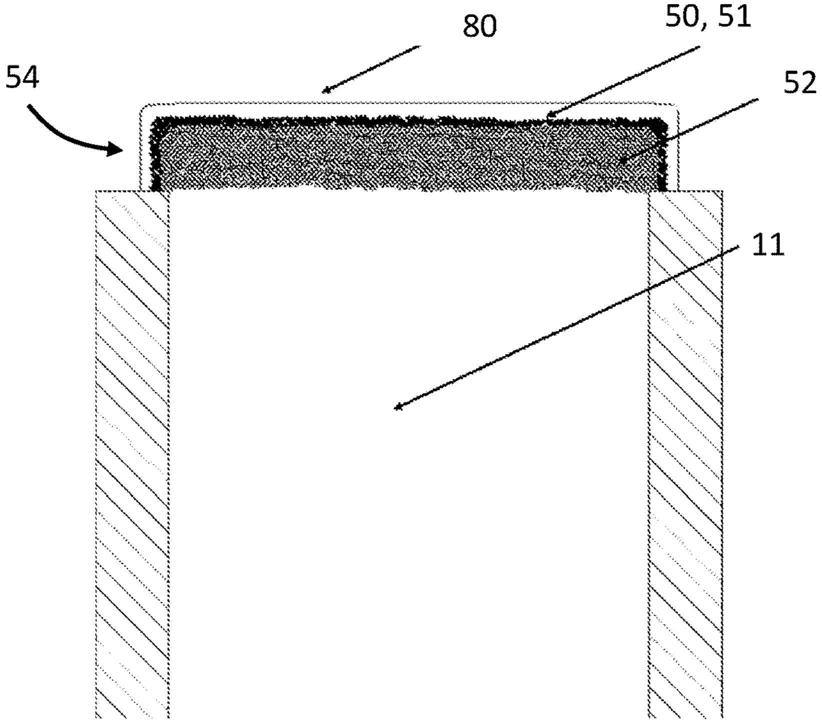
FIG. 7B is a schematic cross-sectional side view of the channel and porous membrane of FIG. 7A. The channel is in the closed, no-flow state.

In one embodiment, the working electrode 50 is a metalized membrane 51, as shown in FIGS. 7A and 7B. In this representation, the membrane 51 is formed by spray deposition of a colloidal silica 52 and then metalized using a chemical vapor deposition (CVD), atomic layer deposition (ALD), or another suitable process to form a CVD or ALD metallization layer. When the device is used, the flow control compound may precipitate onto the metalized membrane. Depositing a film 80 of flow control compound (e.g., polysaccharide or hydrogel), as shown in FIG. 7B, on the membrane 51, blocks the flow in the fluidic channel 11. The precipitate-coated membrane 54 functions as a closed valve.

The deposited flow control compound (e.g., polysaccharide or hydrogel) can be removed by inverting the polarity on the cell, where 1.5 volts to 30 volts is applied to the working electrodes 50, relative to the counter electrode 20 for 0.1 seconds to 500 seconds. This produces $O_2$ gas and hydronium at the electrode, locally increasing the acidity. The reduced pH causes the dissolution of the polysaccharide films, which are soluble at pH levels below 6 or below 6.5. In addition, protonation of the polysaccharide causes electrostatic repulsion from the electrode, releasing and repelling the polysaccharide from the surface.

The fluidic valves described above may be used to control flow in various processes, such as selective product recovery during a synthetic reaction. The channels or groups of channels of the device may be individually and selectively closed and opened for flow. For example, a channel may be opened to allow flow of reagents or may be closed to stop flow and/or to capture a volume of solution to allow a reaction to take place or to recover a reaction product. An example of the fluidic valves used in a selective product recovery process is illustrated in FIGS. 8A-8D.

The device 1' plurality of channels 10 that forms a flow reaction bed. Each of the channels 11 of a plurality of channels 10 is provided with porous metal membrane 51 as the working electrode 50. The working electrodes 50 form an end cap at both ends of the channel 11, as seen in FIG. 7A. The membranes may be formed by depositing, then sintering, a layer of silica nanoparticles to form a porous layer. The porous layer may then be coated with a conductive layers, such as a platinum coating, to act as the working electrode 50 in an electrochemical cell. Alternately, the electrode(s) may be fabricated from Au, Ir, Rh, Ru, $IrO_2$, $RuO_2$, or other noble metals, conductive noble metal oxides, semi-precious metals, or alloys thereof.

Figure 8A:
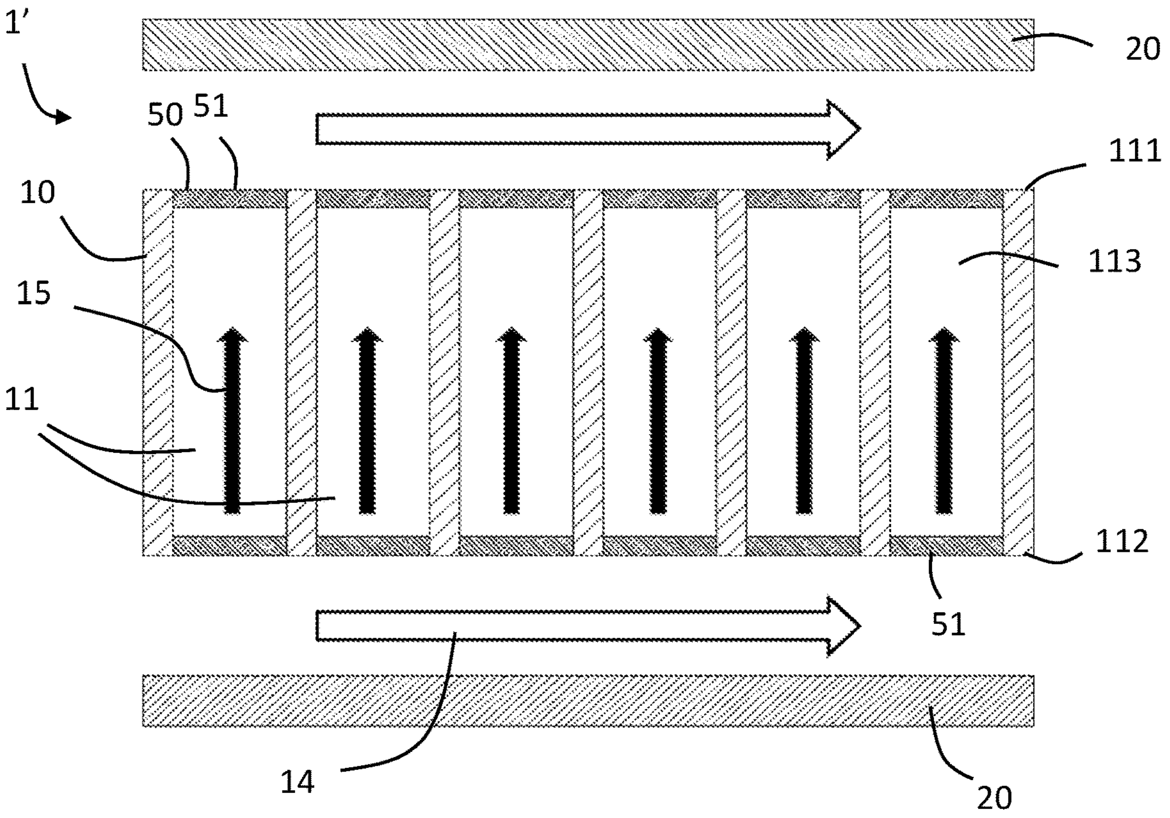
FIGS. 8A to 8D are schematic cross-sectional side views of a fluidic device which uses a porous membrane and bypass flow paths to modulate flow according to an embodiment.
Figure 8B:
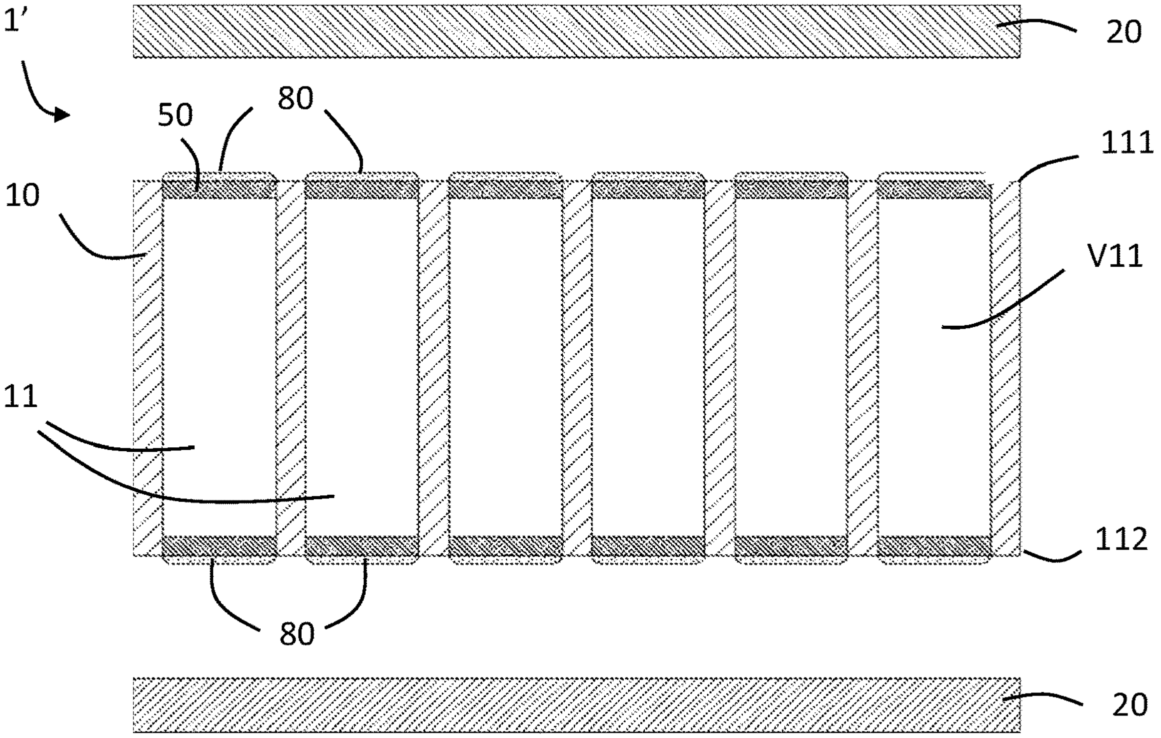
Figure 8C:
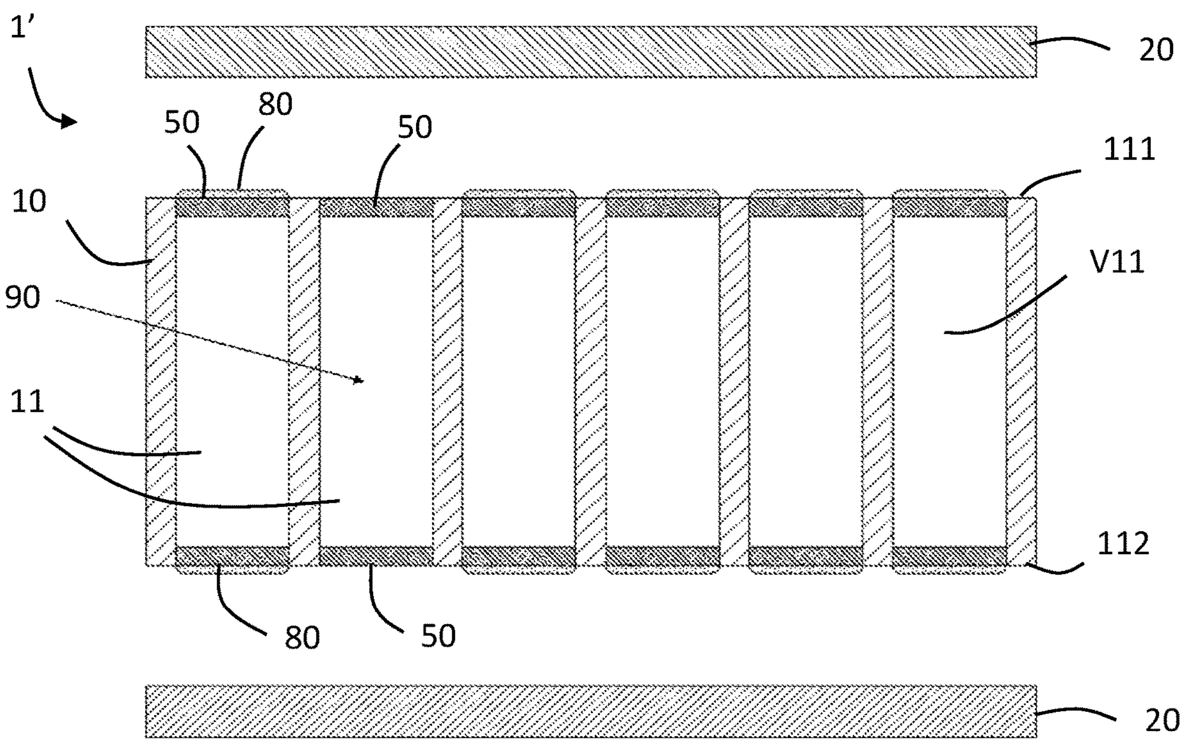

The flow direction of a reactant, such as a DNA deprotection solution, can be directed through the channels 11, as shown by the arrows 15 in FIG. 8A. A polysaccharide solution, as described above, may be flushed over the external membrane 51 surfaces using bypass flows, as shown by the arrows 14 in FIG. 8A. This can be done independently of any reaction reagents included in the solution within the channels 11. The working electrodes 50 of the device 1' are biased to induce electro-deposition of a polysaccharide film 80 on the porous metal membranes 51, as shown in FIG. 8B. This effectively forms a trapped volume V11 inside the channel 11 between the two membranes 51. FIG. 8B shows a fully closed state 92, where all of the channels 11 are closed.

Figure 9A:
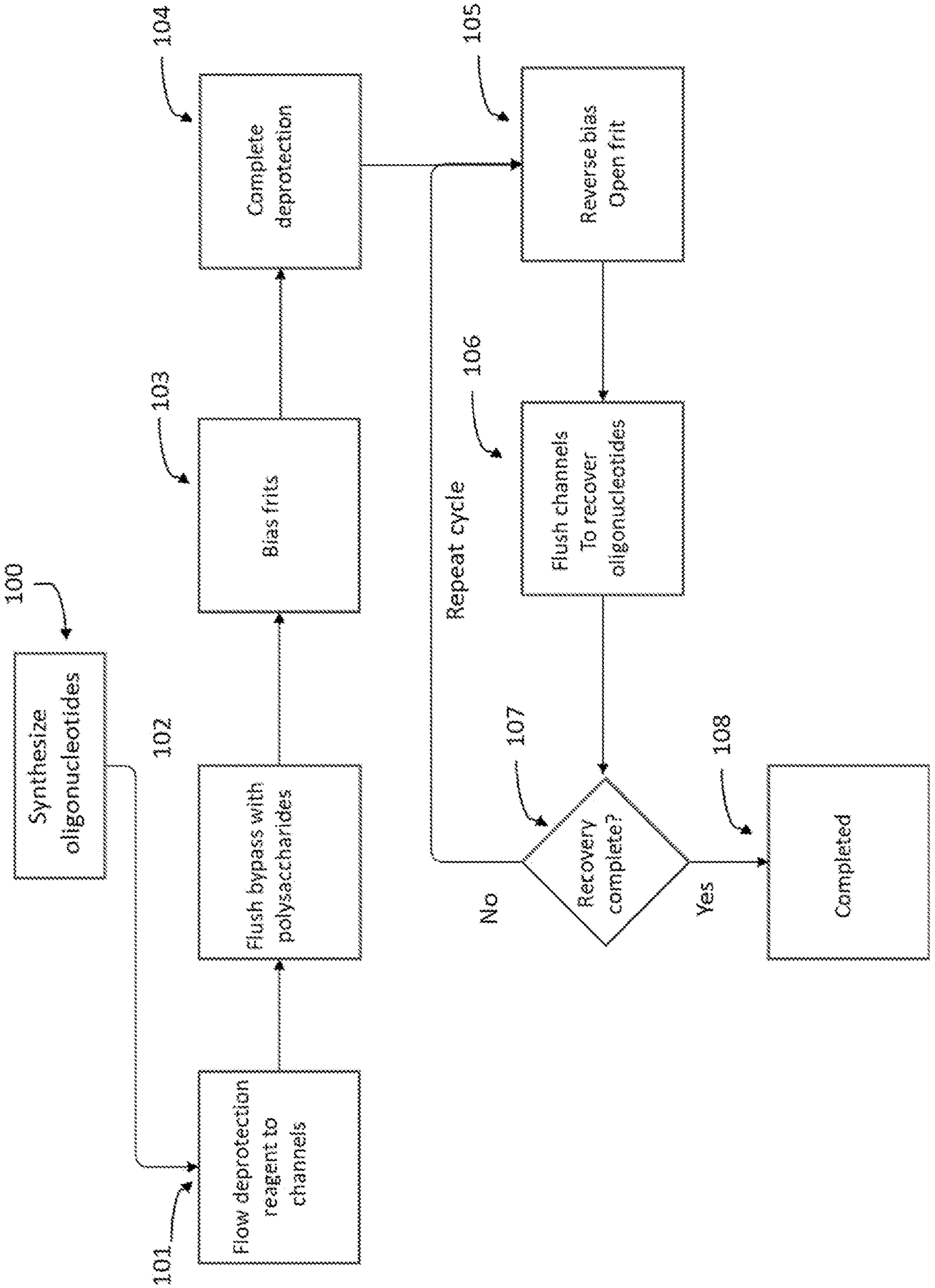
FIG. 9A is a flow diagram of a sample recovery and collection process using a fluidic device with a porous membrane according to an embodiment.

This device can be used to processively address and recover the reaction solution (e.g., defined oligonucleotide sequences), as shown in the flow diagram of FIG. 9A. In step 100, oligonucleotide sequences are synthesized in a highly parallelized process within the channels in an electrochemical microreactor array, with each microreactor containing a specific oligonucleotide. The channels may include a solid support, e.g., functionalized nanobeads as shown in FIG. 6. In step 101, a cleavage and deprotection solution, such as methylamine in ammonium hydroxide, or an ammonium hydroxide solution, is flushed into the fluidic array. The flow direction of this solution is shown by the arrows 15 in FIG. 8A. In step 102, a polysaccharide solution, as described above, is flushed over the external membrane surfaces using bypass flows, as shown by the arrows 14 in FIG. 8A. In step 103, the working electrodes of the microreactor are biased to induce electro-deposition of a polysaccharide film 80 on the metalized membrane surfaces 51 (FIG. 8B). This effectively forms an isolated volume between the two membranes 51.

Figure 8D:
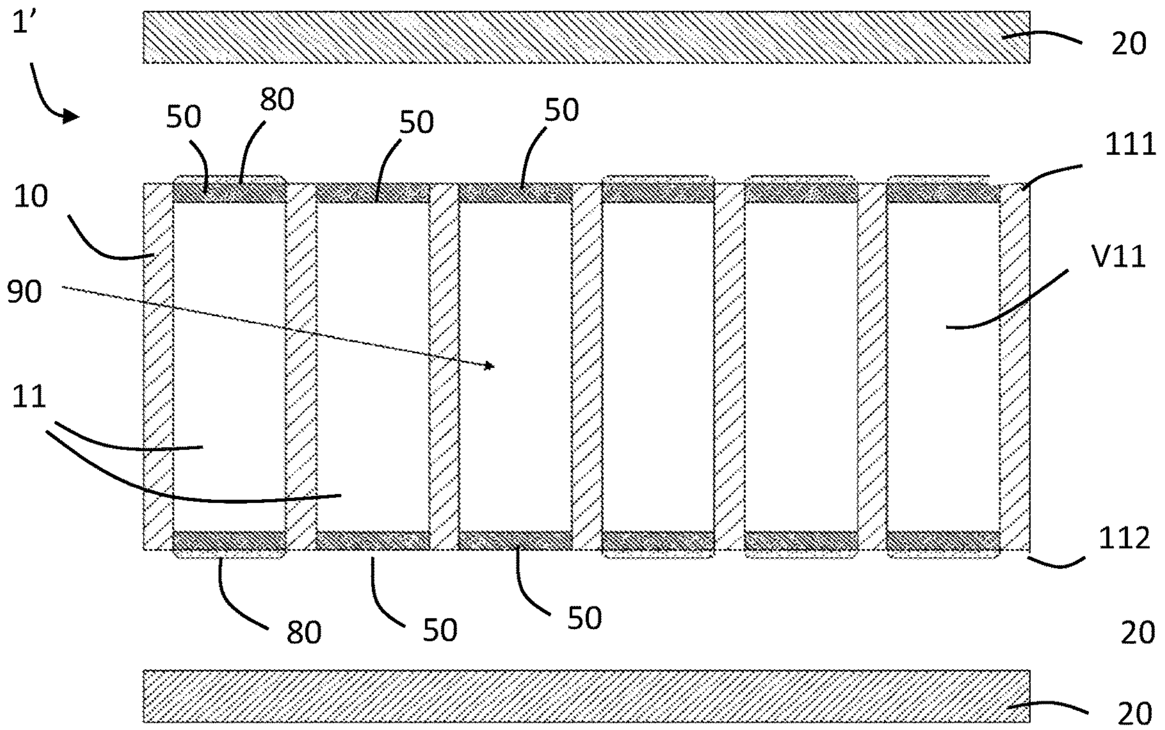

In the exemplary reaction of FIG. 9A, the cleavage and deprotection reagents are allowed to react to completion in step 104. This removes the protecting groups from the nascent oligonucleotides and cleaves them from the surface, releasing them from the solid support for subsequent recovery. This operation may be performed globally for all sequences. In step 105, one or more channels may then be selectively opened to recover the oligonucleotides. Reverse bias may be applied to selected working electrodes 50 to open the channels 11 containing the oligonucleotides to be recovered. In the example shown in FIG. 8C, reverse bias has been applied to the working electrodes 50 of one of the channels 11, which is now open 90. In step 106, once the membranes are open for flow, the nucleotide sequences may be flushed out of the channels, for example into receiving wells for further processing. The next batch of channels containing oligonucleotide to be recovered may be selected. Again, as in step 105, reverse bias is applied to the selected channels with the oligonucleotides to be recovered. FIG. 8D shows the plurality of channels 10 with two of the channels 11 in a fully open state 90. Steps 105 and 106 are then repeated until all the oligonucleotides have been recovered. The oligonucleotides may be selectively pooled and further processed as desired.

Figure 5A:
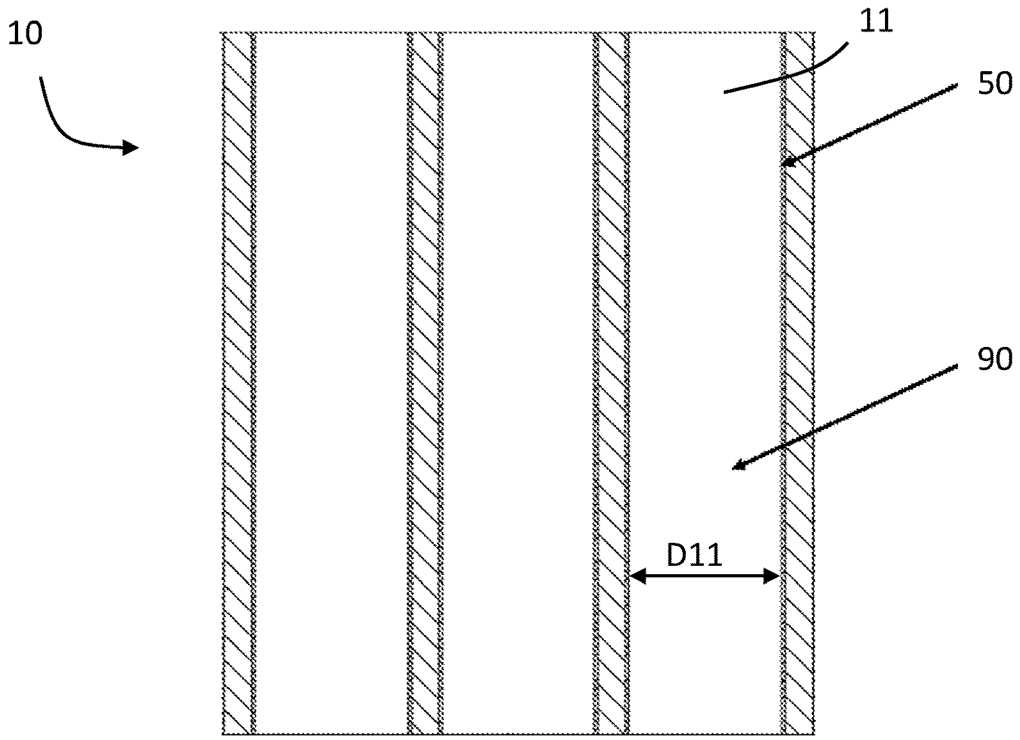
FIG. 5A is a schematic cross-sectional side view of flow channels used for modulating flow according to an embodiment. The channels are shown in the fully open, full flow state.
Figure 5B:
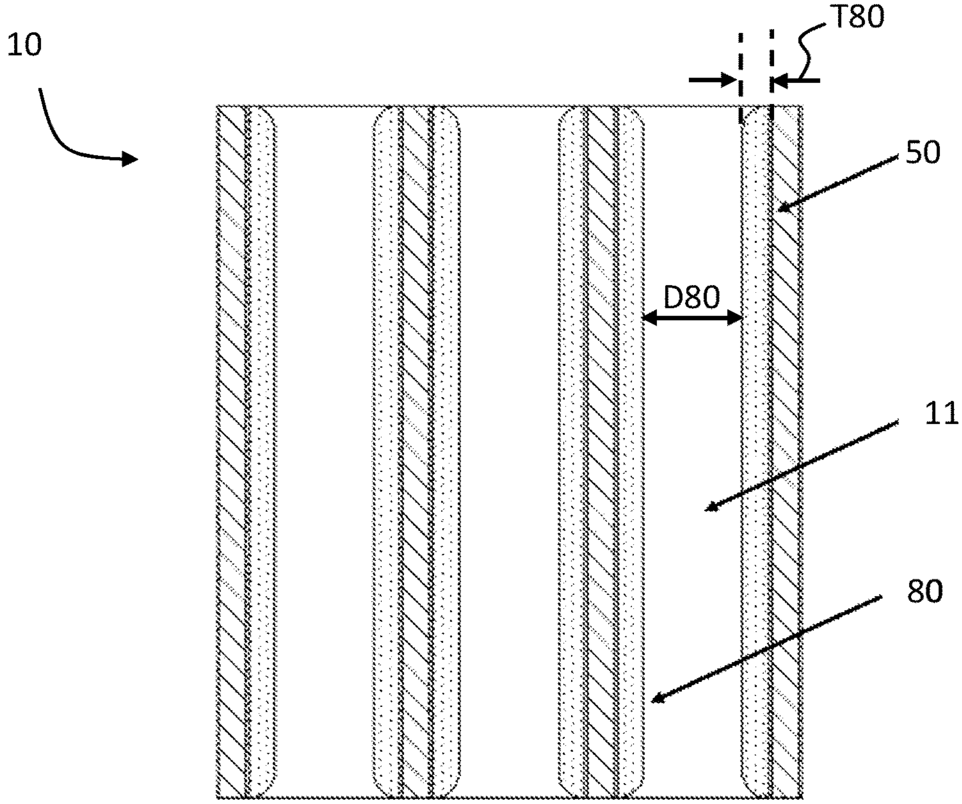
FIG. 5B is a schematic cross-sectional side view of the flow channels of FIG. 5A in a partially open state.
Figure 5C:
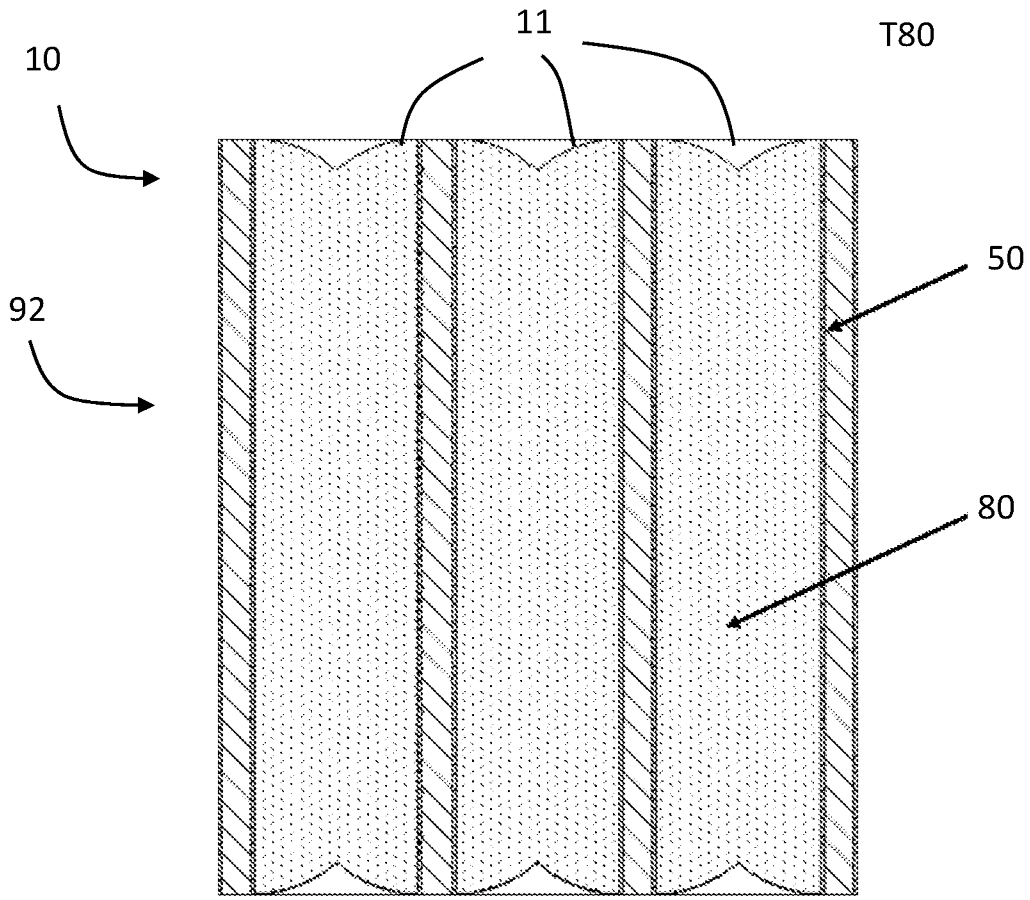
FIG. 5C is a schematic cross-sectional side view of the flow channels of FIG. 5A in the closed no-flow state.
Figure 9B:
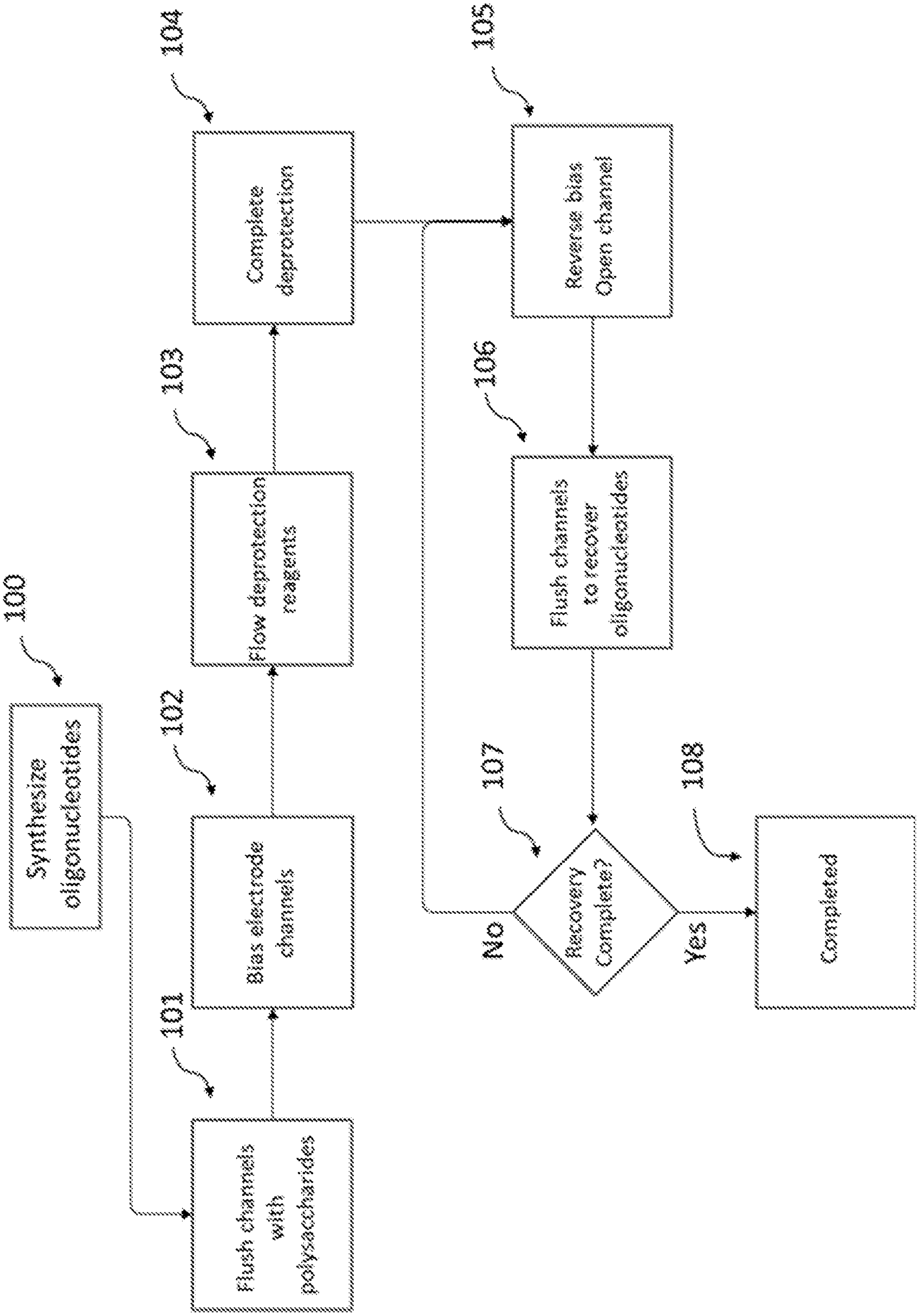
FIG. 9B is a flow diagram of a sample recovery and collection process using a fluidic device with fluidic channels according to an embodiment.

In the embodiment shown in FIG. 9B, the working electrodes 50 are formed on the inside surfaces of the channels 11, as shown, for example, in FIGS. 5A-5C, and the flow is controlled by flushing the polysaccharide solution through the channels, and applying (step 102) and/or reversing (step 105) the bias.

Figure 10:
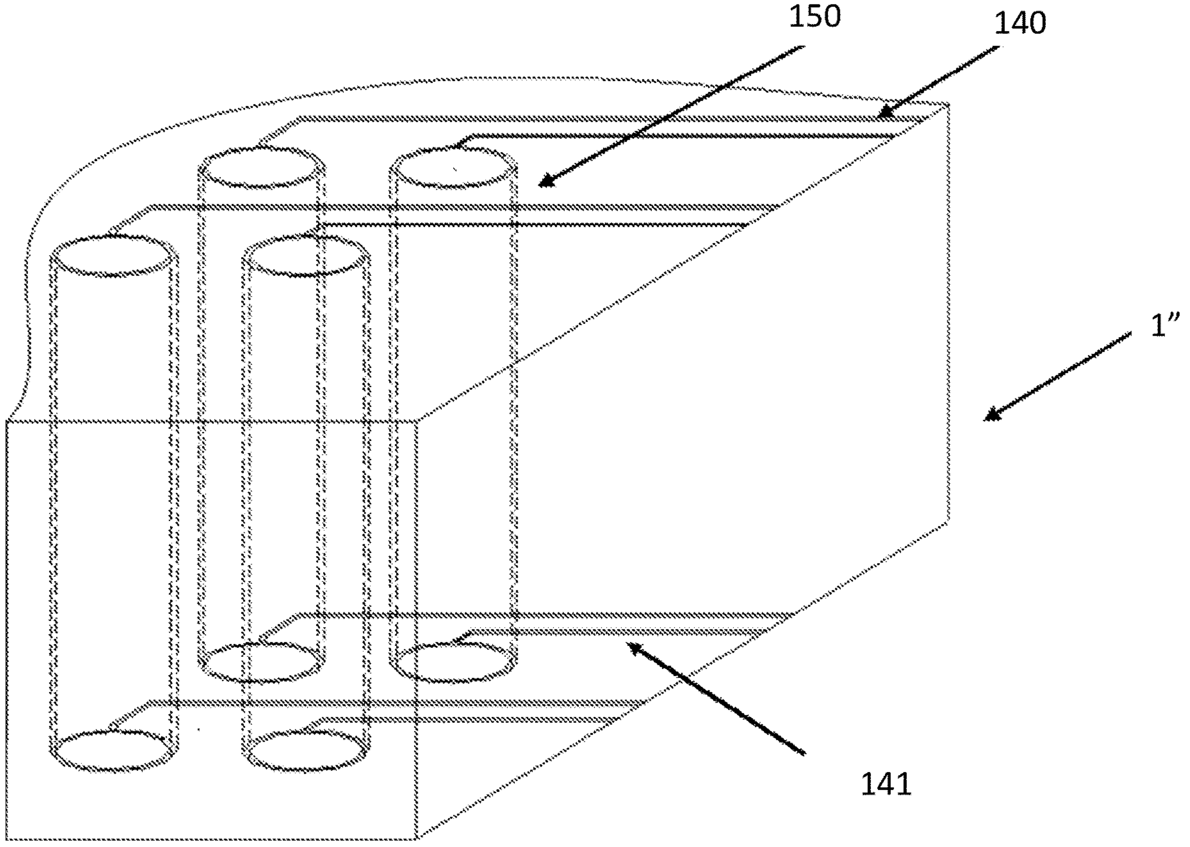
FIG. 10 is a perspective view of an electrode configuration of a fluidic device to be utilized for heating according to an embodiment.

An alternate embodiment would be the formation of a microvalve which uses a reversible thermal process to aid in the solubilization of the polysaccharide, as shown in FIG. 10. The device 1" includes a plurality of channels 11 with electrodes 150 having two contacts. To enable heating, the current flows through the electrode 150, via contact 140, to common, or ground, via contact 141. Alternatively, only one of the connections would be used and the current would flow from the electrode 150 through the electrolyte to the counter electrode 120.

The invention is defined in the claims. However, below there is provided a non-exhaustive listing of non-limiting exemplary aspects. Any one or more of the features of these aspects may be combined with any one or more features of another example, embodiment, or aspect described herein.

Figure 11A:
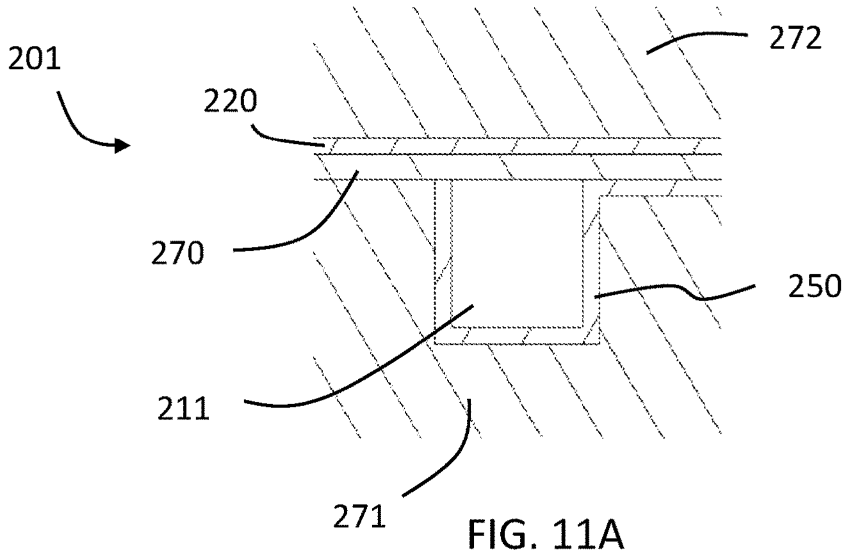
FIGS. 11A and 11B are cross-sectional side views of a channel with multiple working electrodes according to an embodiment.
Figure 11B:
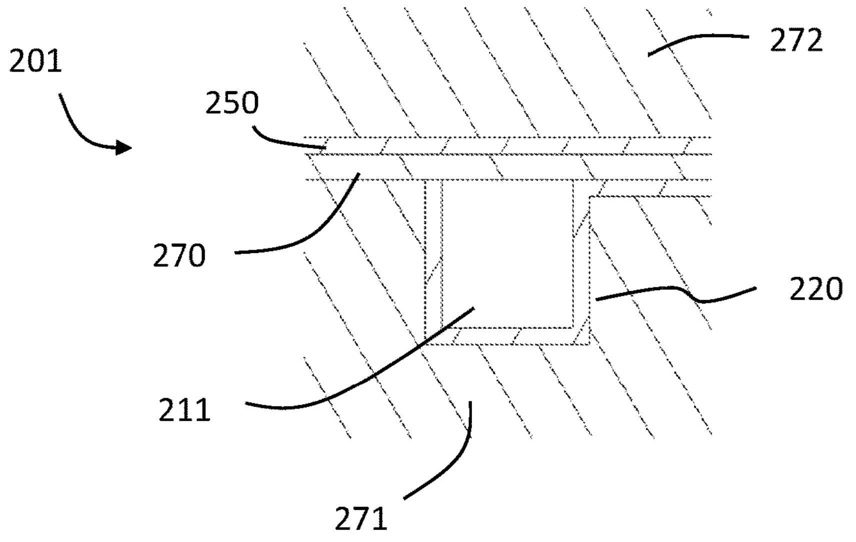
Figure 11C:
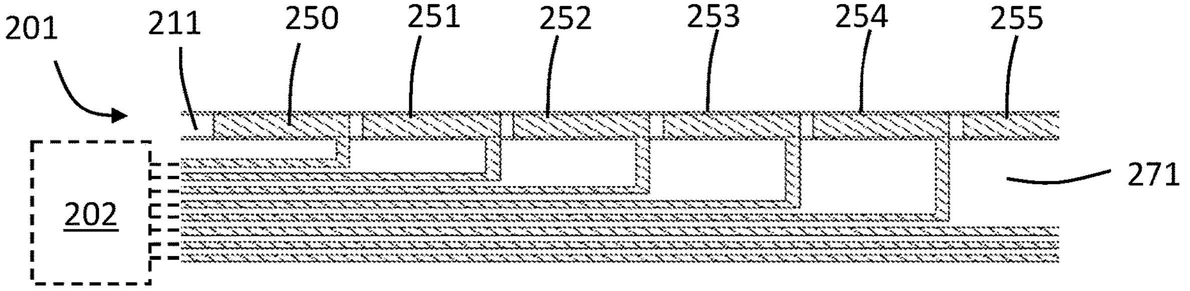
FIG. 11C is a top view of the channel of FIG. 11A.

In some embodiments, the channel is formed as a groove or trench in a block of material. Such channels may be fitted with multiple electrodes per channel. An example of a device 201 including such a channel 211 is shown in FIGS. 11A-11C. The channel 211 may be formed by a trench in an insulating substrate 271. Examples of suitable insulating substrates include silicon oxide, glass, and insulating polymers, such as polymethylmethacrylate (PMMA), polycarbonate (PC), polystyrene (PS), and polydimethylsiloxane (PDMS). The trenches can be formed by, molding, stamping, etching or other patterning processes such as two-photon polymerization. A working electrode 250 may be formed on the inside surface of the channel 211 by coating of a conductive layer. Such coatings may be prepared, for example, by physical vapor deposition (PVD), chemical vapor deposition (CVD), atomic layer deposition (ALD), electrochemical plating, or electroless plating techniques. The working electrode 250 may be a coating having a thickness of not less than 0.002 μm, not less than 0.1 μm, or even not less than 0.5 μm thick. In some embodiments, the working electrode may be a coating having a thickness of not greater than 0.2 μm, not greater than 0.5 μm, or even not greater than 1.0 μm thick. The working electrode 250 may be separated from a counter electrode 220 by an insulating spacer 270. The counter electrode 220 may further be covered by an insulating cover 272.

The insulating spacer 270 may be deposited on the working electrode 250 using PVD, CVD of ALD deposition processes. Similarly, the counter electrode 220 may be deposited onto the insulating cover 272, and the cover 272 with the counter electrode 220 may then be bonded to the base substrate 271 which contains the working electrode 250.

Alternatively, the positions of the working electrode 250 and counter electrode 220 may be swapped, as shown in FIG. 11B. The counter electrode 220 is provided as a plating on the inside surface of the channel 211, and the working electrode 250 is spaced apart from the counter electrode by an insulating spacer 270.

The channel 211 may include multiple working electrodes 250. FIG. 11C shows a top view of the channel 211 and working electrodes 250, 251, 252, 253, 254, 255 without the spacer 270, counter electrode 220, or insulating cover 272. Each of the working electrodes 250, 251, 252, 253, 254, 255 may be individually connected to a power source 202.

The working electrode and the counter electrode may independently both include one or more noble metals. Illustrative noble metals can include, for example platinum (Pt), gold (Au), iridium (Ir), rhodium (Rh), and ruthenium (Ru). Additionally, the working electrode and the counter electrode may independently both include a conductive oxide of a noble metal, or an alloy of a noble metal. Additionally, the working electrode and the counter electrode may independently both include one or more noble metals, one or more oxides of a noble metal, one or more alloys of a noble metals, or any combination thereof. Additionally, the working electrode and the counter electrode may independently both include a conductive oxide of a semi-noble metal, or an alloy of metals, or metal oxides which form a conductive film. Alternately, the electrodes may include oxides, such as $SiO_2$, $Al_2O_3$, $TiO_2$ or similar, doped with a metal such as platinum, nickel, tungsten or similar metals. In some embodiments, a working electrode and a counter electrode may include platinum (Pt), for example.

Optionally, in some embodiments where the working electrode or counter electrode is a coating on an inner surface of the channel, an adhesion layer may be present between the inner surface of the channel and the metal layer. The adhesion layer functions to increase adhesion of the metal layer to the material of the inner surface itself. In some embodiments, the adhesion layer may include Ti, TiN, $TiO_2$, Ta, $Ta_2N_5$, or $Al_2O_3$, or similar. The specific material chosen can depend at least in part on the material of the inner surface of the channel, the material of the working electrode, other factors not specifically called out herein, or any combination thereof.

Exemplary Aspects

Disclosed aspects herein include fluidic device aspect A that include at least one reaction channel, the at least one reaction channel comprising: a working electrode; a counter electrode; a channel, wherein the channel is electrically connected to both the working electrode and the counter electrode, and the working electrode is electrically isolated from the counter electrode (i.e., the counter electrode is not in direct contact with the working electrode), and a solution within the channel, the solution comprising at least one polysaccharide and an electrolyte, wherein a voltage applied to the working electrode relative to the counter electrode will cause the solubility of the polysaccharide in the solution to change thereby modulating flow in, out or both of the channel.

Disclosed aspects herein include fluidic device aspect B that include at least a working electrode; a porous metal membrane formed in electrical contact with the working electrode; and a valve, the valve comprising a solution in contact with the porous metal membrane and the working electrode, the solution comprising at least one polysaccharide and an electrolyte, wherein a voltage applied to the working electrode will cause the solubility of the polysaccharide in the solution to change thereby modulating flow relative to the porous metal membrane.

Disclosed aspects herein include method aspect C of modulating flow in a reaction channel, the reaction channel comprising: a working electrode; a counter electrode; and a channel, wherein the channel is electrically connected to both the working electrode and the counter electrode, and the working electrode is electrically isolated from the counter electrode (i.e., the counter electrode is not in direct contact with the working electrode), the method comprising: adding a solution into the channel, the solution comprising at least one polysaccharide and an electrolyte; and applying a voltage to the working electrode relative to the counter electrode, wherein application of the voltage modulates flow in, out or both of the channel by affecting the solubility of the at least one polysaccharide.

The fluidic device aspects A or B or method aspects C herein, wherein the working electrode includes a coating of metal on at least a portion of the inner surface of the channel.

The fluidic device aspects A or B or method aspects C herein further comprising an adhesion layer positioned between the inner surface of the channel and the coating of metal that forms the working electrode. The fluidic device aspects A or B or method aspects C herein, wherein the adhesion layer includes Ti, TiN, $TiO_2$, Ta, $Ta_2N_5$, $Al_2O_3$, or similar.

The fluidic device aspects A or B or method aspects C herein, wherein the working electrode is electrically connected to an electrical contact for connection to a power source.

The fluidic device aspects A or B or method aspects C herein, wherein the working electrode, the counter electrode, or both independently include a noble metal, an alloy of a noble metal, an oxide of a noble metal, or any combination thereof.

The fluidic device aspects A or B or method aspects C herein, wherein the working electrode, the counter electrode, or both independently include platinum (Pt), gold (Au), iridium (Ir), rhodium (Rh), ruthenium (Ru), alloys thereof, or oxides thereof. Alternately the electrodes are include a metal such as nickel, cobalt, or similar. Further the electrodes could be include a conductive oxide such as indium tin oxide, $Ti_xNb_yO_z$, or similar.

The fluidic device aspects A or B or method aspects C herein, wherein the application of the voltage to the working electrode will cause the pH of the solution to change thereby affecting the solubility of the polysaccharide.

The fluidic device aspects A or B or method aspects C herein, wherein the application of the voltage to the working electrode will cause the temperature of the solution to change thereby affecting the solubility of the polysaccharide.

The fluidic device aspects A or B or method aspects C herein, wherein the application of the voltage to the working electrode will cause both the pH and the temperature of the solution to change thereby affecting the solubility of the polysaccharide.

The fluidic device aspects A or B or method aspects C herein, wherein the channel has a width from 0.1 micrometers (μm) to 10,000 μm. The fluidic devices or methods herein, wherein the channel has a length from 0.1 millimeters (mm) to 500 mm.

The fluidic device aspects A or B or method aspects C herein, wherein the working electrode and the counter electrode are from 1 μm to 1000 μm apart.

The fluidic device aspects A or B or method aspects C herein, wherein the fluidic device includes a plurality of reaction channels in the form of an array. The fluidic device aspects A or B or method aspects C herein wherein the counter electrodes of each reaction channel are a single structure. The fluidic device aspects A or B or method aspects C herein, wherein the single structure includes a plate covering one major surface of the array. The fluidic device aspects A or B or method aspects C herein, wherein the plate is electrically isolated from the working electrodes of each reaction channel by a gasket or insulating spacer.

The fluidic device aspects A or B or method aspects C herein, wherein the polysaccharide is selected from alginates, chitosan, chitin, chemically modified versions of these saccharides, or combinations thereof.

The fluidic device aspects A or B or method aspects C herein, wherein the polysaccharide is chitosan, chitin, a chemically modified version of chitosan or chitin, or a combination thereof.

The fluidic device aspects A or B or method aspects C herein, wherein the flow control compound (e.g., polysaccharide) is at a concentration of 0.05 grams/Liter (g/L) to 5 g/L in the solution.

The fluidic device aspects A or B or method aspects C herein, wherein the solution further includes acetic acid, propanoic acid, malonic acid, maleic acid, malic acid, hydroxybenzoic acid, formic acid, oxalic acid, citric acid, or combinations thereof.

The fluidic device aspects A or B or method aspects C herein, wherein the solution further includes inorganic salts, organic salts, or combinations thereof.

The fluidic device aspects A or B or method aspects C herein, wherein the inorganic salt is selected from KOH, NaOH, $NH_4OH$, or combinations thereof, is added to the solution to bring the pH of the solution up to 4.5 to 5.5.

The fluidic device aspects A or B or method aspects C herein, wherein the organic salt is selected from tetraethylammonium p-toluenesulfonate, 1-butyl 3-methyl-imidazolium tetrafluoroborate, 1-butyl-3-methyl imidazolium tosylate, 1,1-dimethyl-pyrrolidinium tris(pentafluoroethyl) trifluorophosphate, 1,3-dimethyl-imidazolium trifluoromethanesulfonate, 3-methyl-N-butyl-pyridinium hexafluorophosphate, tetraethyl ammonium tetrafluoroborate, N-hexyl-pyridinium hexafluorophosphate, or combinations thereof, is added to the solution to bring the pH of the solution up to 4.5 to 5.5.

The fluidic device aspects A or B or method aspects C herein, wherein application of the voltage for a first amount of time, $t_1$, restricts flow within the reaction channels.

The fluidic device aspects A or B or method aspects C herein, wherein application of the voltage for a second amount of time, $t_2$, wherein $t_2$ is longer than $t_1$, stops flow within the reaction channels.

The fluidic device aspects A or B or method aspects C herein, wherein the working electrode is a porous metal membrane on a first end of the channel. The fluidic device aspects A or B or method aspects C herein, wherein the porous metal membrane includes a functionalized layer of sintered silica nanoparticles, metal oxide nanoparticles, or metal nanoparticles. The fluidic device aspects A or B or method aspects C herein, wherein the functionalized layer includes a noble metal. The fluidic device aspects A or B or method aspects C herein wherein the noble metal includes platinum (Pt), gold (Au), iridium (Ir), rhodium (Rh), ruthenium (Ru), their conductive oxides, or alloys thereof. The fluidic device aspects A or B or method aspects C herein, wherein application of the voltage causes a polysaccharide film to form from the solution on the working electrode, thereby blocking flow out of that end of the channel. The fluidic device aspects A or B or method aspects C herein, wherein the second end of the channel also includes a porous metal membrane formed thereon. The fluidic device aspects A or B or method aspects C herein, wherein application of the voltage causes a polysaccharide film to form from the solution on both of the porous metal membranes, thereby blocking flow out of both ends of the channel.

The fluidic device aspects A or B or method aspects C herein, wherein the solubility of the polysaccharide functions to stop flow in, out, or both of the reaction channel.

The fluidic device aspects A or B or method aspects C herein, wherein the solubility of the polysaccharide functions to control the flow rate in, out or both of the reaction channel.

The fluidic device aspects A or B or method aspects C herein, wherein application of a second voltage that is the reverse polarity of the first voltage functions to increase the solubility of the polysaccharide.

The present invention is illustrated by the following examples. It is to be understood that the particular examples, materials, amounts, and procedures are to be interpreted broadly in accordance with the scope and spirit of the invention as set forth herein.

EXAMPLES

All reagents, starting materials, and solvents used in the following examples were purchased from commercial suppliers (such as Sigma Aldrich, St. Louis, MO) and were used without further purification unless otherwise indicated.

Example 1

Figure 12A:
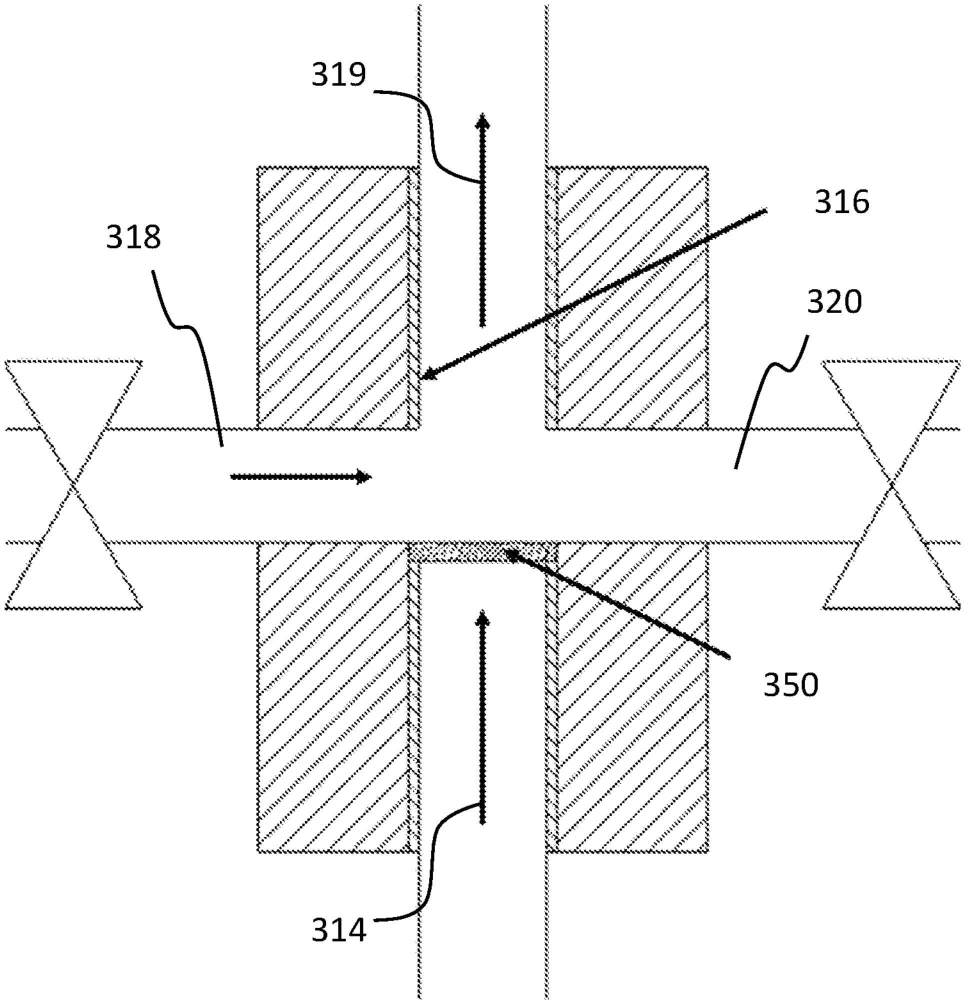
FIG. 12A is a schematic cross-sectional side view of a fluidic device used to test the modulation of flow across the metal frit according to an embodiment.
Figure 12B:
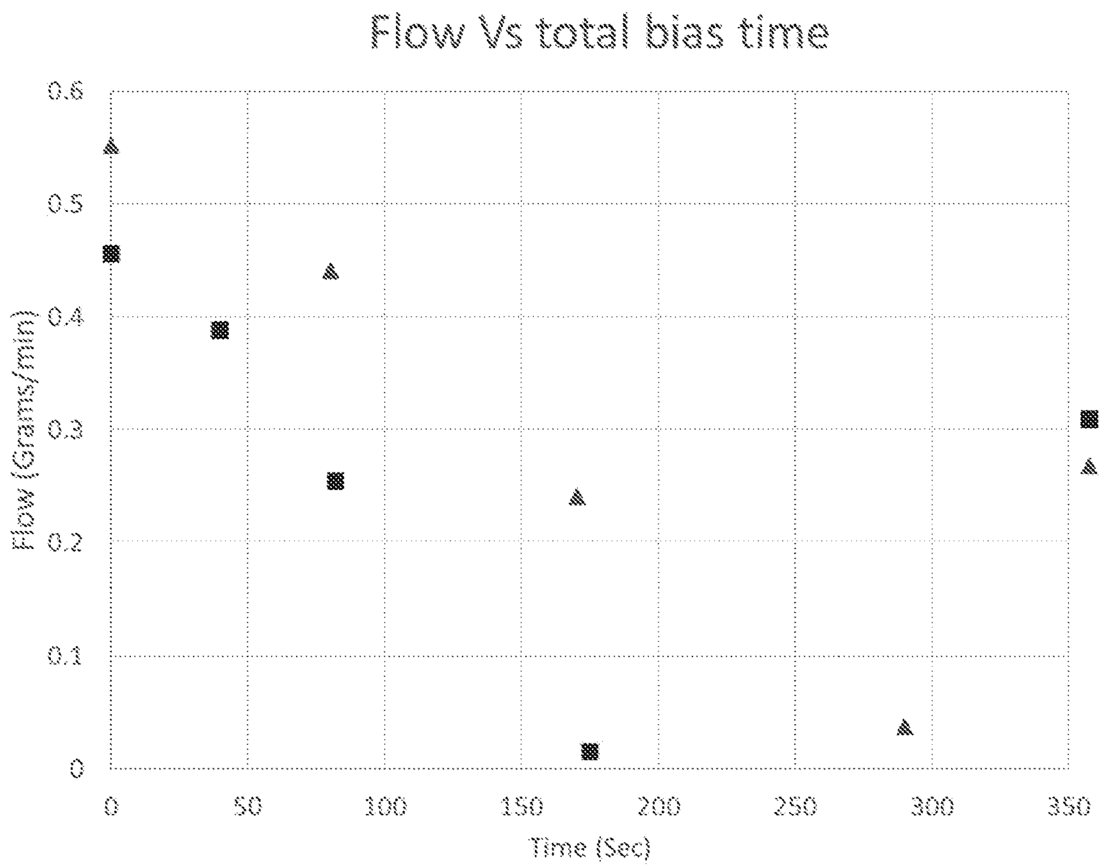
FIG. 12B is a graph for flow versus total time of applied bias. The graph shows repeat cycles of flow modulation.
Figure 12C:
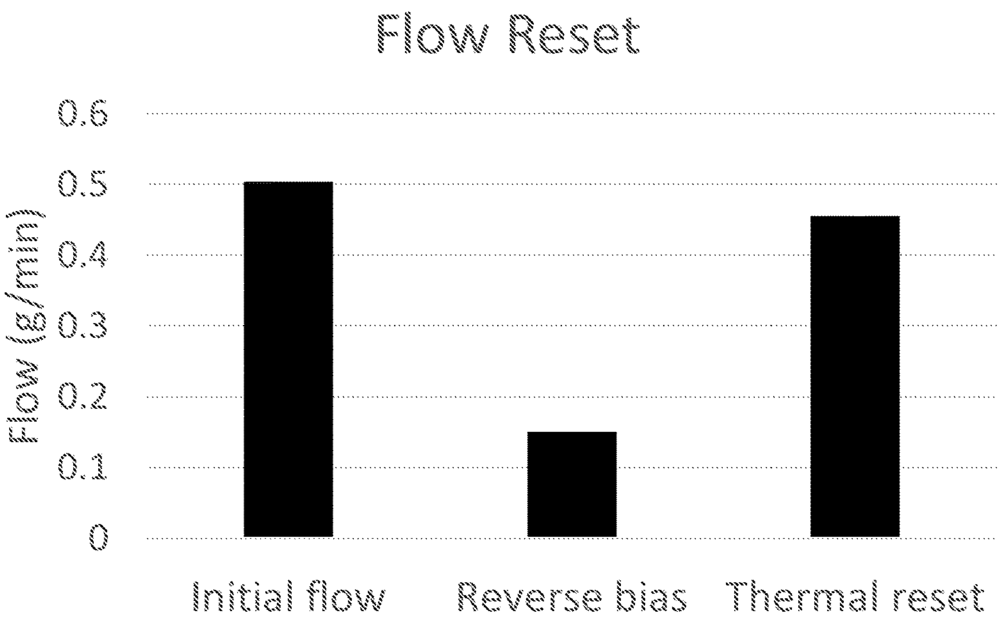
FIG. 12C is a bar graph which shows the effectiveness of several methods to recover flow after flow had been blocked by an electrochemical process.

A test device, shown schematically in FIG. 12, was used to determine if the deposition of a polysaccharide film on a metal filter frit could be used to modulate flow. A polysaccharide was dissolved in an aqueous solution of 5% acetic acid in water, at a concentration of 1 g polysaccharide/liter. The solution was adjusted to pH 5 by addition of KOH. A commercially available 2 μm stainless-steel filter frit 350 was utilized to function as a membrane. This was connected to the negative terminal of variable DC power supply through contact to a stainless-steel delivery tube. The counter electrode, formed by a stainless-steel tube 316 used as the delivery line to the collection flask, was connected to the positive terminal. Electrolyte was pumped along inlet line 314 through the frit 350 into a receiver flask using delivery line 319. The flow was determined by measuring the mass transferred into the receiver flask on a digital balance. The mass was recorded using the output on the balance to transfer the data to the computer. A negative DC bias was applied to the stainless-steel frit. This caused polysaccharide to deposit onto the stainless-steel frit, which acted as the flow modulation device. The bias was turned off, then a flow measurement was taken. This process was repeated until the flow was at, or near zero. FIG. 12A shows the flow versus total bias time for two consecutive runs at a DC bias of −7.0 V. This demonstrates that the flow across the frit can be blocked by the application of negative potential to a stainless-steel frit in an electrolyte containing the polysaccharide. FIG. 12C shows the flow values obtained after resetting the device. Reversing the bias on the frit yielded a recovery of flow, although not a 100% recovery of flow. Alternately, if the bias on the frit was reversed while heating the device to approximately 50° C. in pH 5 electrolyte (5% acetic acid in water), the flow was more fully recovered, as seen in FIG. 12C.

The frit was flushed between runs using a pH 5 solution in the bypass flow from a pump along bypass line 318 to another receiver flask along line 320.

Example 2

Figure 13A:
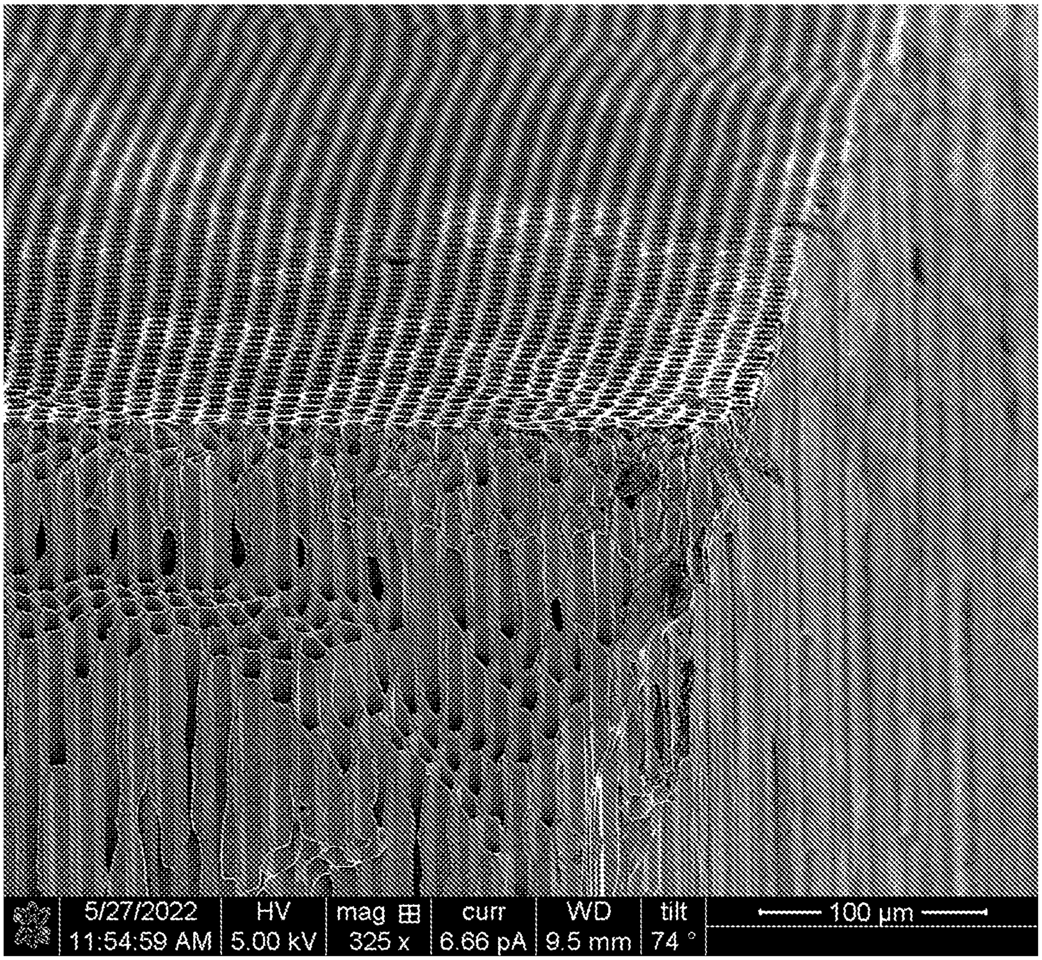
FIGS. 13A and 13B are microscopic images of channels prepared according to embodiments.
Figure 13B:
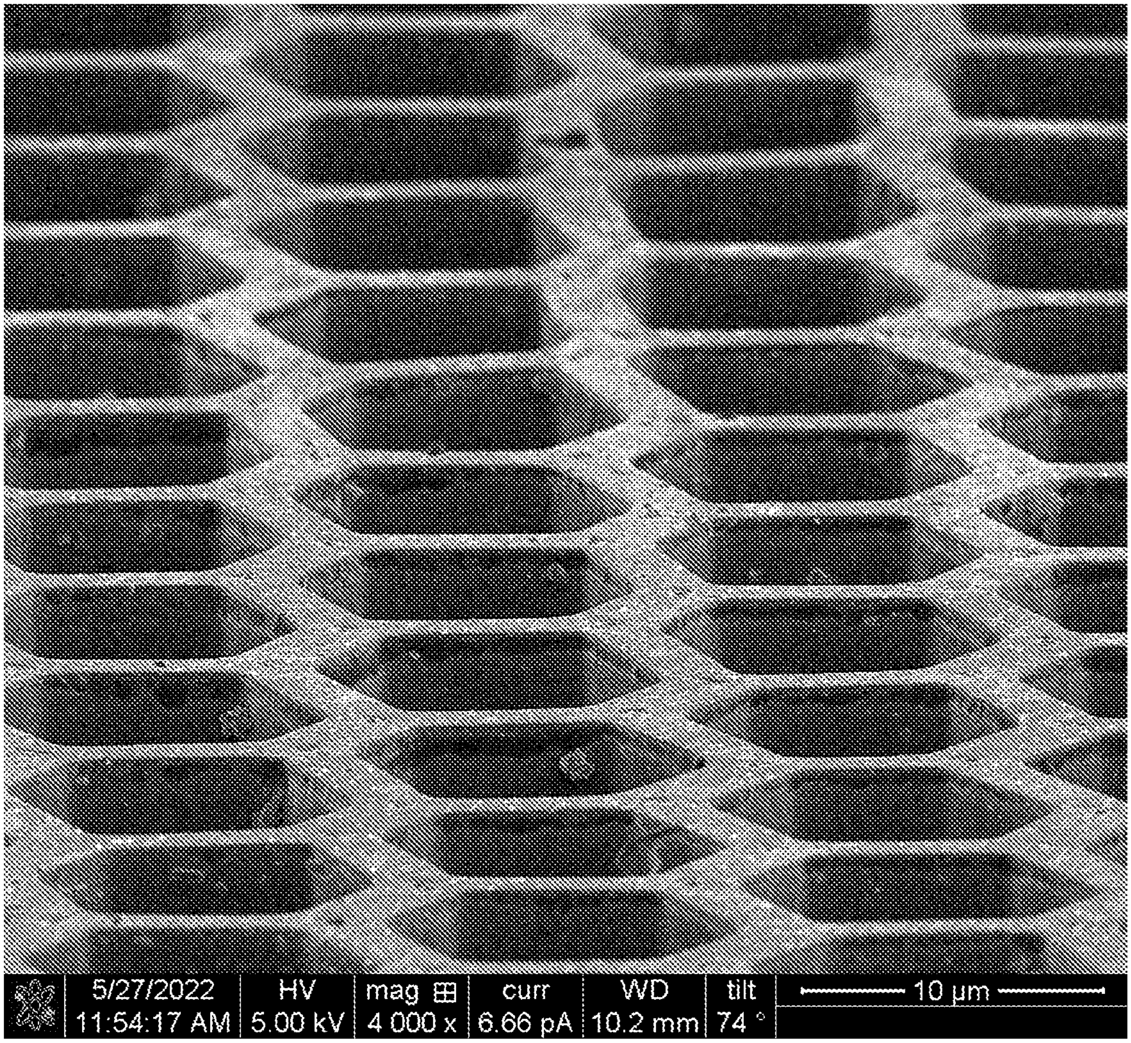

A plurality of plated channels (microcapillaries) were prepare according to embodiments of the present disclosure. Microscopic images of the plurality of channels are shown in FIGS. 13A and 13B.

The complete disclosure of all patents, patent applications, and publications, and electronically available material (including, for instance, nucleotide sequence submissions in, e.g., GenBank and RefSeq, and amino acid sequence submissions in, e.g., SwissProt, PIR, PRF, PDB, and translations from annotated coding regions in GenBank and RefSeq) cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A fluidic device comprising:
- a plurality of reaction channels in the form of an array, each reaction channel comprising:
  - a working electrode;
  - a counter electrode disposed at a distance from the working electrode; and
  - a channel electrically connected to both the working electrode and the counter electrode, the channel comprising a first end and a second end;
- wherein the counter electrodes of each reaction channel are a single structure comprising a plate covering one major surface of the array, and
- wherein flow through the plurality of reaction channels is controllable by controlling a voltage applied to the working electrode relative to the counter electrode.

2. The fluidic device of claim 1, wherein the working electrode comprises a coating of metal on at least a portion of an inner surface of the channel.

3. The fluidic device of claim 1, wherein the working electrode, the counter electrode, or both independently comprise platinum (Pt), gold (Au), iridium (Ir), rhodium (Rh), ruthenium (Ru), alloys thereof, or oxides thereof, nickel (Ni), cobalt (Co), chromium (Cr), molybdenum (Mo), tungsten (W), alloys thereof, or oxides $SiO_2$, $TiO_2$, $Ta_2O_5$, $Al_2O_3$, mixtures thereof, or alloys thereof.

4. The fluidic device of claim 1, wherein each of the plurality of reaction channels has a width from 0.1 micrometers (μm) to 10,000 μm and a length from 0.1 millimeters (mm) to 500 mm.

5. The fluidic device of claim 1, wherein the distance between the working electrode and the counter electrode is from 1 μm to 1000 μm.

6. The fluidic device of claim 1, wherein the working electrode is a porous metal membrane on the first end of the channel.

7. The fluidic device of claim 6, wherein the porous metal membrane comprises a functionalized layer of sintered silica, or metal oxide, or metal nanoparticles, and wherein the functionalized layer comprises a noble metal.

8. The fluidic device of claim 1, wherein each of the plurality of reaction channels comprises a plurality of working electrodes, and wherein each of the plurality of working electrodes is individually connected to a power source.

9. A fluidic system comprising the fluidic device and a solution within the fluidic device, the fluidic device comprising:

a working electrode;

a porous metal membrane formed in electrical contact with the working electrode; and a valve comprising the solution in contact with the porous metal membrane and the working electrode, the solution comprising a flow control compound and an electrolyte, wherein solubility of the flow control compound in the solution is configured to change upon application of a voltage to the working electrode.

10. The fluidic system of claim 9, wherein the flow control compound is selected from alginates, chitosan, chitin, chemically modified versions of these saccharides, PASP-l-PNIPAAm, or a combination thereof.

11. The fluidic system of claim 9, wherein the flow control compound is a polysaccharide.

12. The fluidic system of claim 9, wherein each of the plurality of reaction channels has a width from 0.1 micrometers (μm) to 10,000 μm and a length from 0.1 millimeters (mm) to 500 mm.

13. A method of modulating flow in a plurality of reaction channels in the form of an array, each reaction channel comprising:

a working electrode;

a counter electrode; and a channel, wherein the channel is electrically connected to both the working electrode and the counter electrode, and the working electrode is electrically isolated and disposed at a distance from the counter electrode, the channel comprising a first end and a second end;

wherein the counter electrodes of each reaction channel are a single structure comprising a plate covering one major surface of the array, the method comprising:

adding a solution into the plurality of reaction channels, the solution comprising a flow control compound and an electrolyte; and applying a first voltage to the working electrodes relative to the counter electrodes, wherein application of the voltage modulates flow in, out, or both in and out of the plurality of reaction channels by affecting solubility of the flow control compound.

14. The method of claim 13, wherein the application of the first voltage to the working electrode will cause pH or temperature or both pH and temperature of the solution to change, thereby affecting the solubility of the flow control compound.

15. The method of claim 13, wherein the flow control compound is selected from alginates, chitosan, chitin, chemically modified versions of these saccharides, PASP-l-PNIPAAm, or a combination thereof.

16. The method of claim 13, wherein application of the first voltage for a first amount of time, $t_1$, restricts flow within the reaction channels.

17. The method of claim 16, wherein application of the first voltage for a second amount of time, $t_2$, wherein $t_2$ is longer than $t_1$, stops flow within the reaction channels.

18. The method of claim 13, wherein the working electrode is a porous metal membrane on the first end of the channel.

19. The method of claim 13, wherein application of the first voltage causes a film to form from the solution on the working electrode, thereby blocking flow out of that end of the channel.

20. The method of claim 13, wherein application of a second voltage with a reverse polarity of the first voltage functions to increase the solubility of the polysaccharide.

* * * * *